US010500916B2

(12) United States Patent
Strong et al.

(10) Patent No.: US 10,500,916 B2
(45) Date of Patent: Dec. 10, 2019

(54) AXEL LOAD MONITORING SYSTEM

(71) Applicants: Brooks Strong, Houston, TX (US);
Joshua Cayne Fisher, Montgomery, TX (US)

(72) Inventors: Brooks Strong, Houston, TX (US);
Joshua Cayne Fisher, Montgomery, TX (US)

(*) Notice: Subject to any disclaimer, the term of this patent is extended or adjusted under 35 U.S.C. 154(b) by 271 days.

(21) Appl. No.: 15/790,353

(22) Filed: Oct. 23, 2017

(65) Prior Publication Data

US 2019/0118605 A1    Apr. 25, 2019

(51) Int. Cl.
| | | |
|---|---|---|
| *G01G 19/00* | (2006.01) | |
| *B60G 17/015* | (2006.01) | |
| *B60D 1/46* | (2006.01) | |
| *B60G 17/052* | (2006.01) | |

(Continued)

(52) U.S. Cl.
CPC ......... *B60G 17/0155* (2013.01); *B60D 1/465* (2013.01); *B60G 5/01* (2013.01); *B60G 17/0523* (2013.01); *B60D 2001/008* (2013.01); *B60G 2202/413* (2013.01); *B60G 2204/81* (2013.01); *B60G 2300/02* (2013.01); *B60G 2300/09* (2013.01); *B60G 2300/402* (2013.01); *B60G 2400/40* (2013.01); *B60G 2400/61* (2013.01); *B60G 2800/019* (2013.01)

(58) Field of Classification Search
CPC .. B60G 17/0155; B60G 5/01; B60G 17/0523; B60G 2202/413; B60G 2204/81; B60G 2300/02; B60G 2300/09; B60G 2300/402; B60G 2400/40; B60G 2400/61; B60G 2800/019; B60D 1/465; B60D 2001/008; G01M 1/125; G01G 19/025
USPC ........................................... 701/124; 702/173
See application file for complete search history.

(56) References Cited

U.S. PATENT DOCUMENTS 5,167,289 A * 12/1992 Stevenson ................ G01G 5/04
                                                    177/141
5,193,063 A *  3/1993 Assh ................... B60G 17/0155
                                                    180/209

(Continued)

FOREIGN PATENT DOCUMENTS

| EP | 0246790 A2 * | 11/1987 | ............ B60T 8/1708 |
|---|---|---|---|
| JP | 2006226812 A | 8/2006 | |
| JP | 2011099696 A * | 5/2011 | |

*Primary Examiner* — Tuan C To

(57) ABSTRACT

An axle load monitoring system for a load-transporting motor vehicle having one or more auxiliary axles wherein the monitoring system detects a noncompliant carrying-weight condition when the current gross vehicle weight is more than a prescribed maximum allowable gross vehicle weight assigned thereto and/or the current carrying weight of any primary axle and any designated axle group is more than a prescribed maximum allowable carrying weight assigned thereto. And if the current gross vehicle weight is equal to or less than the prescribed maximum allowable gross vehicle weight and the current center of gravity of the vehicle is in a compliance-manageable range which is established by the monitoring system and specific to the vehicle, the monitoring system recommends auxiliary axle usage that would result in compliance with the prescribed maximum and minimum allowable carrying weight assigned to each of the primary axles, any designated axle group and any utilized auxiliary axle.

20 Claims, 19 Drawing Sheets

(51) Int. Cl.
 *B60G 5/01* (2006.01)
 *B60D 1/00* (2006.01)

(56) References Cited

U.S. PATENT DOCUMENTS

| | | | | |
|---|---|---|---|---|
| 5,987,397 A * | 11/1999 | McCool | ................. | G01G 19/07 700/38 |
| 6,189,901 B1 * | 2/2001 | Smith | ...................... | B60G 9/00 180/209 |
| 6,237,406 B1 * | 5/2001 | Nance | .................... | G01G 19/07 73/178 T |
| 2002/0073878 A1 * | 6/2002 | Teacherson | ............. | B61F 3/125 105/3 |
| 2002/0157563 A1 * | 10/2002 | Richmond | ............... | B61D 7/04 105/247 |
| 2010/0114437 A1 * | 5/2010 | Boss | ...................... | B60K 28/08 701/48 |
| 2011/0035105 A1 * | 2/2011 | Jolly | ................... | B60G 17/015 701/37 |
| 2018/0120147 A1 * | 5/2018 | Hall | ...................... | G01G 19/02 |
| 2018/0274967 A1 * | 9/2018 | Holmes | ................. | G01B 11/00 |
| 2019/0120684 A1 * | 4/2019 | Oren | ...................... | G01G 3/125 |

* cited by examiner

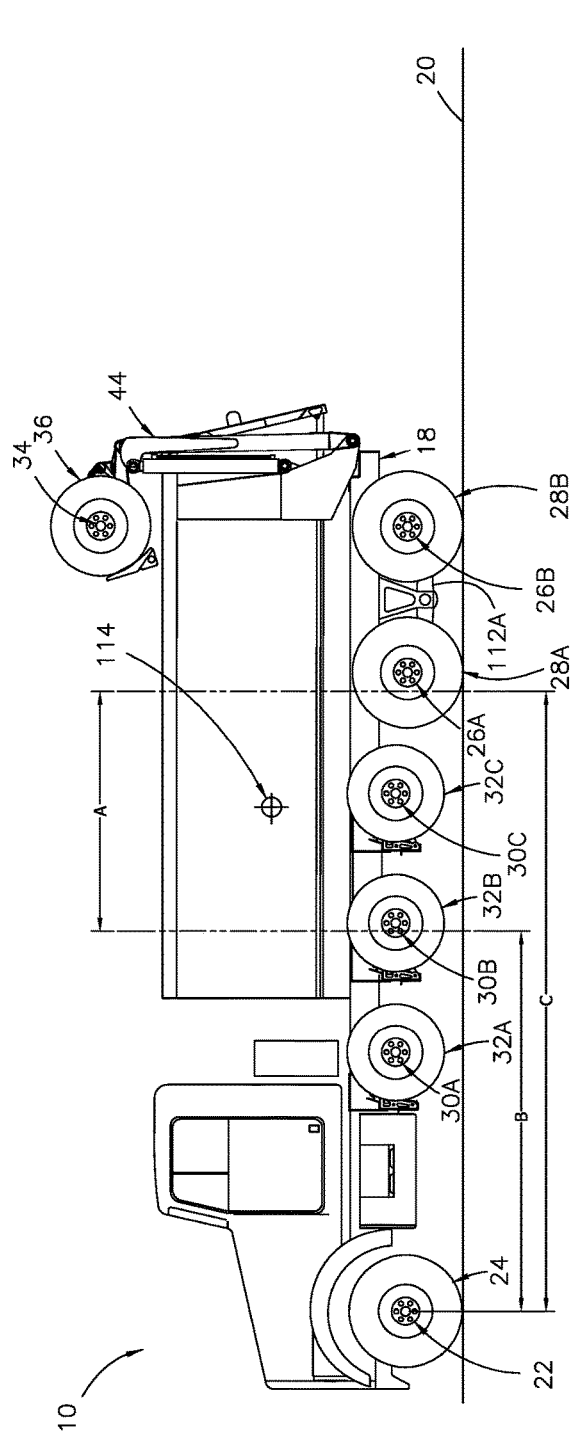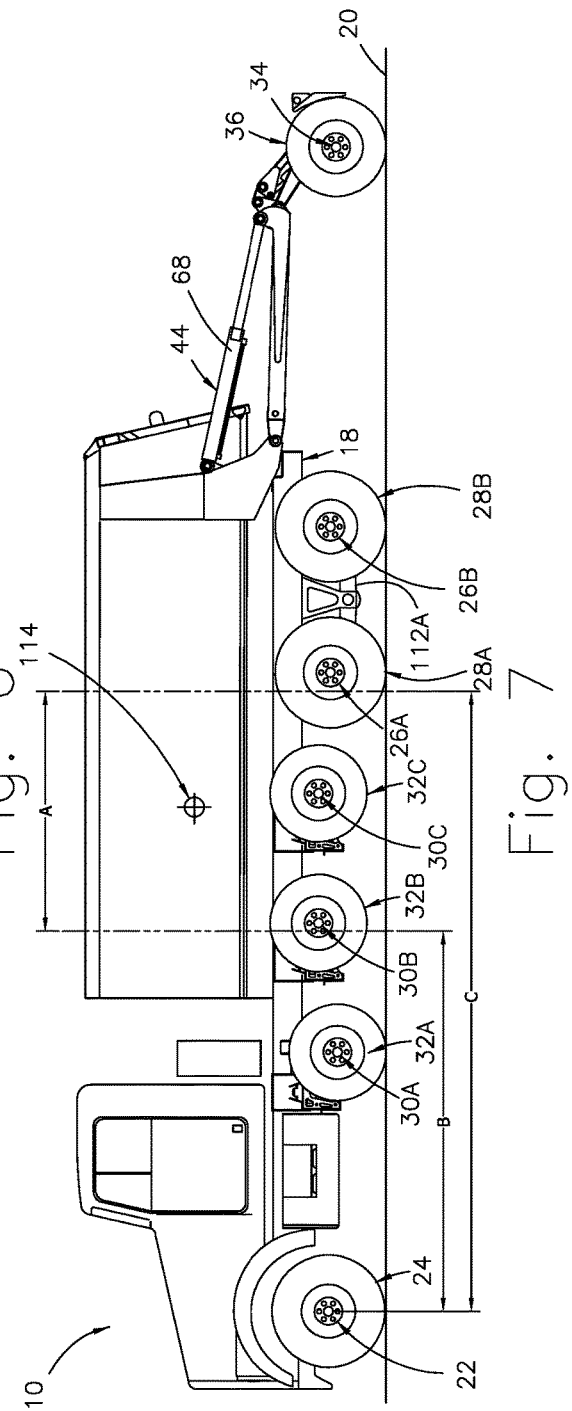

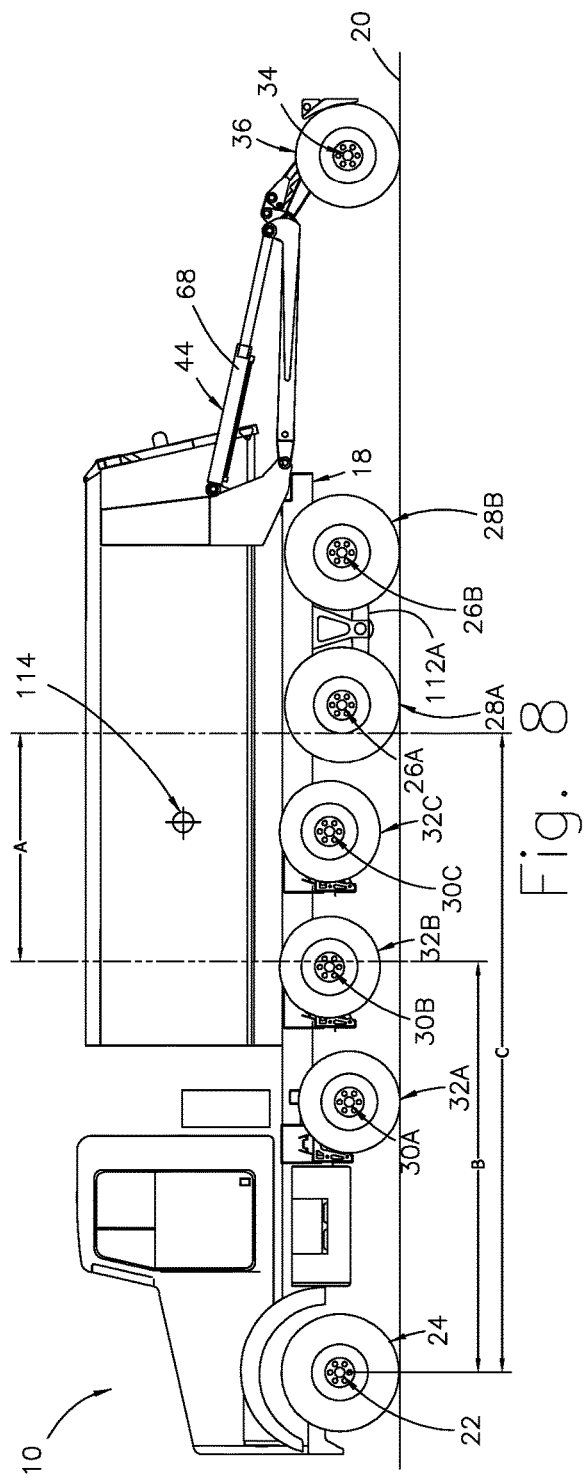
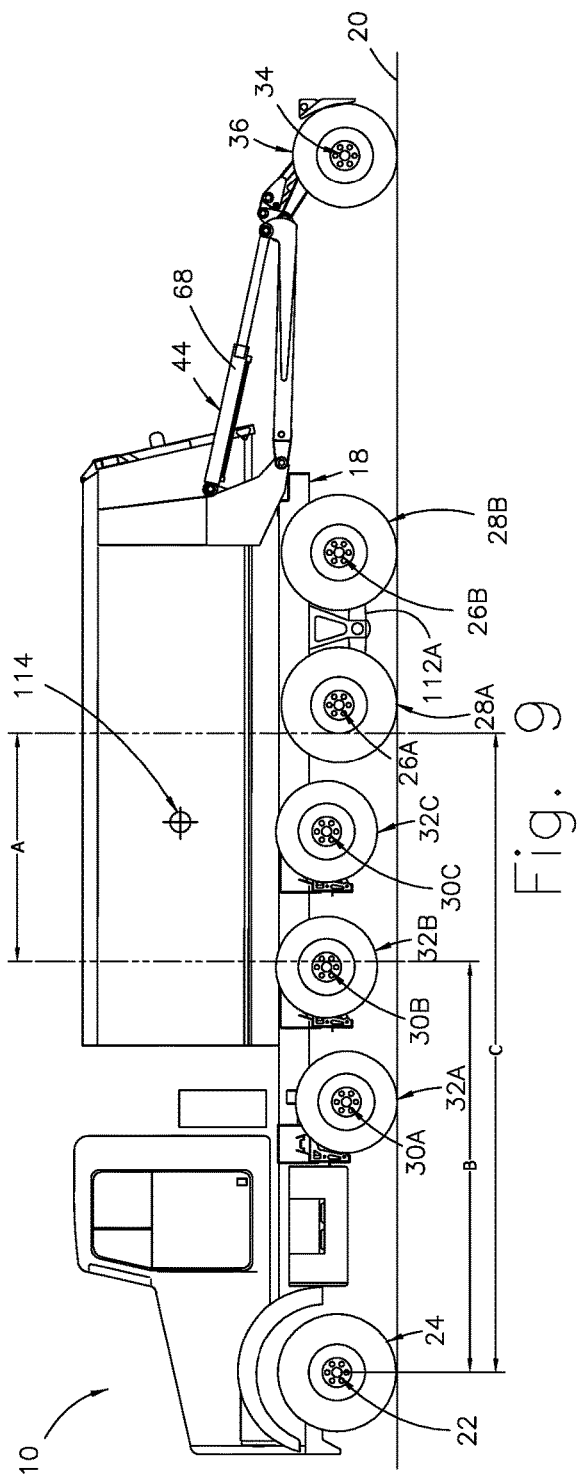

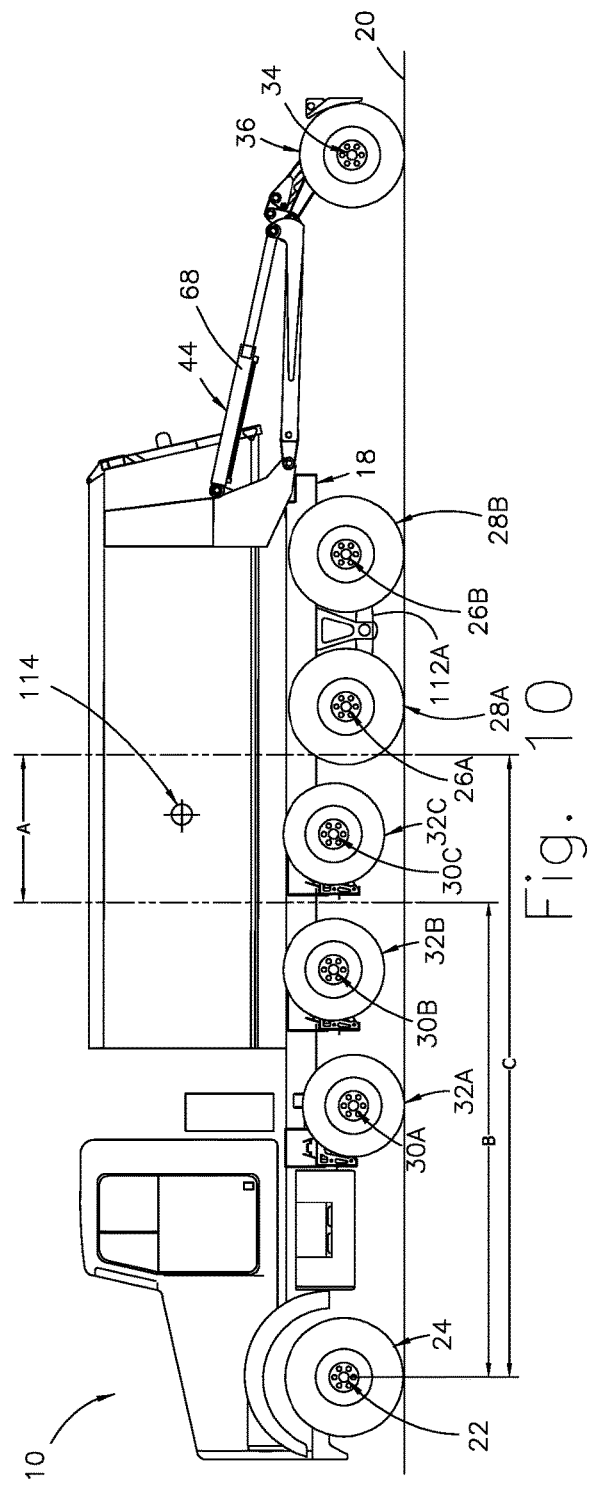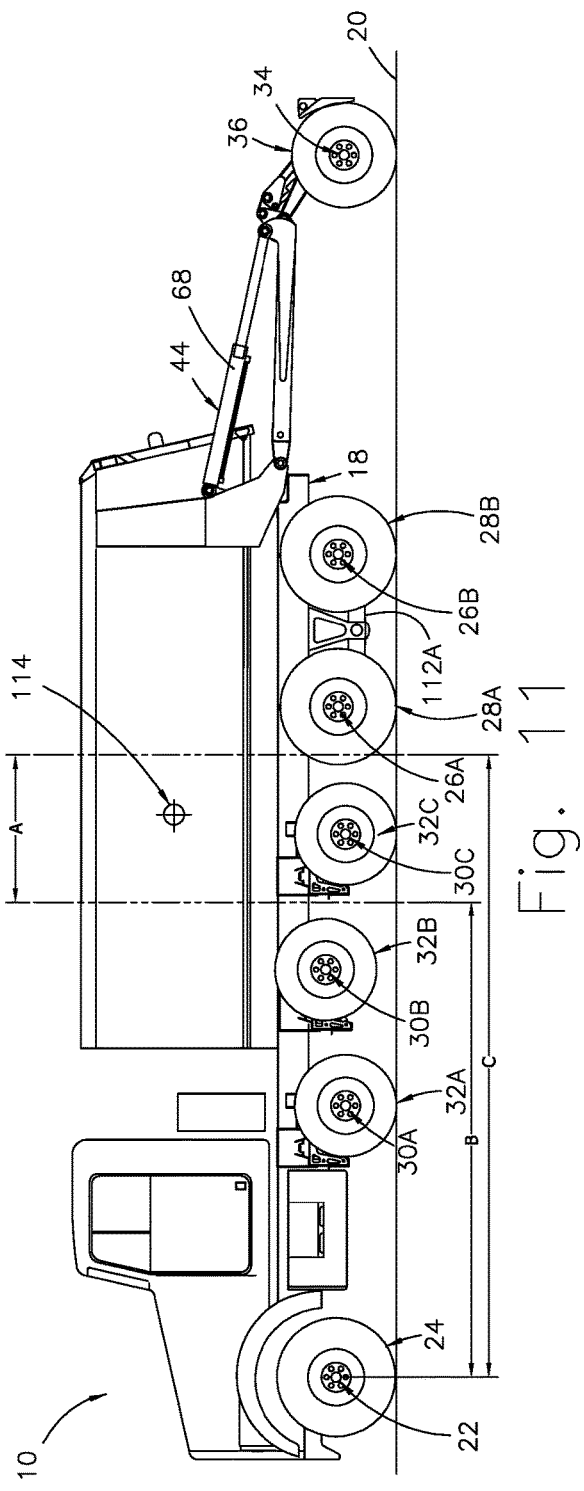

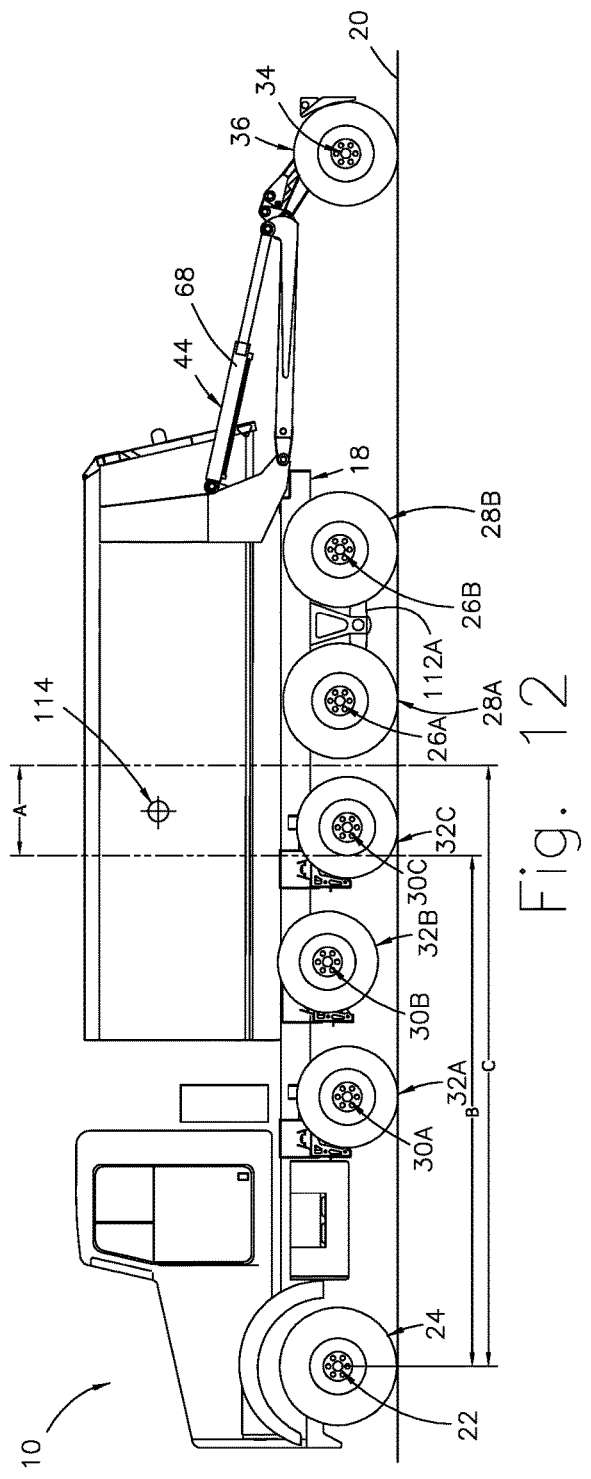
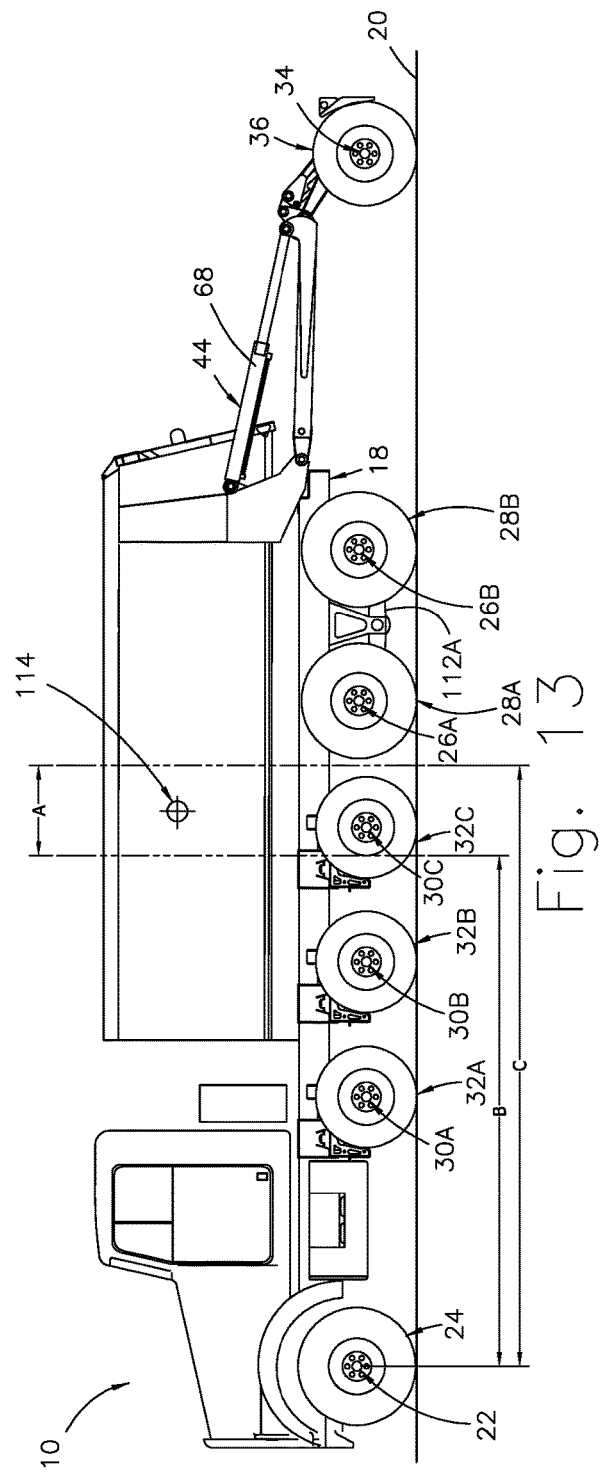

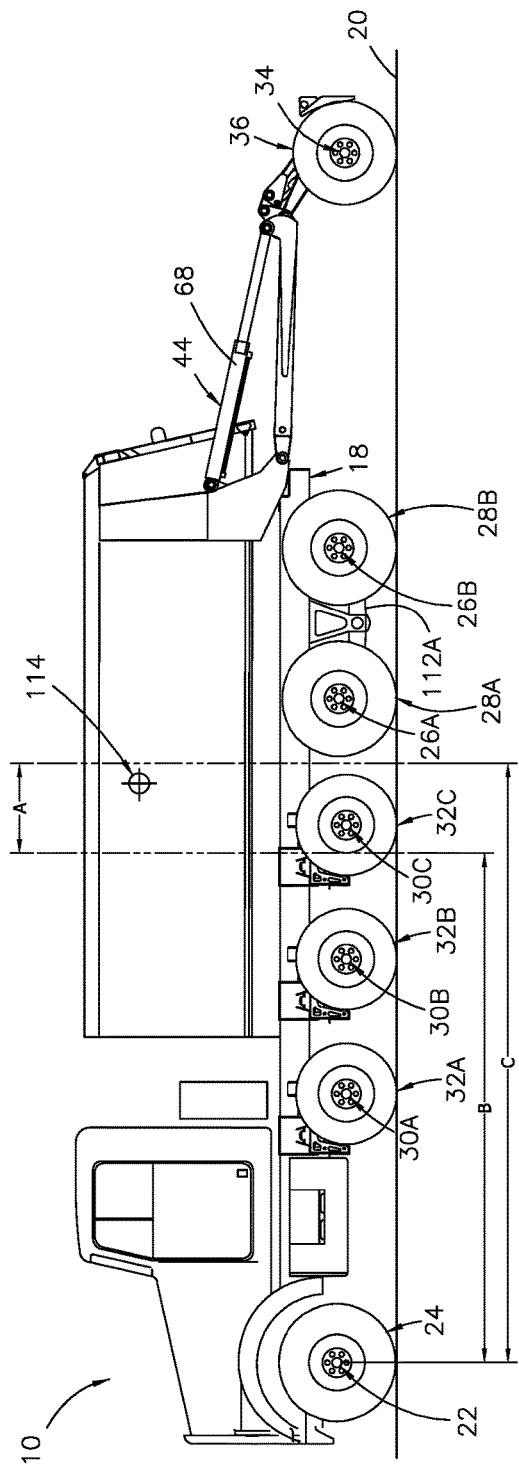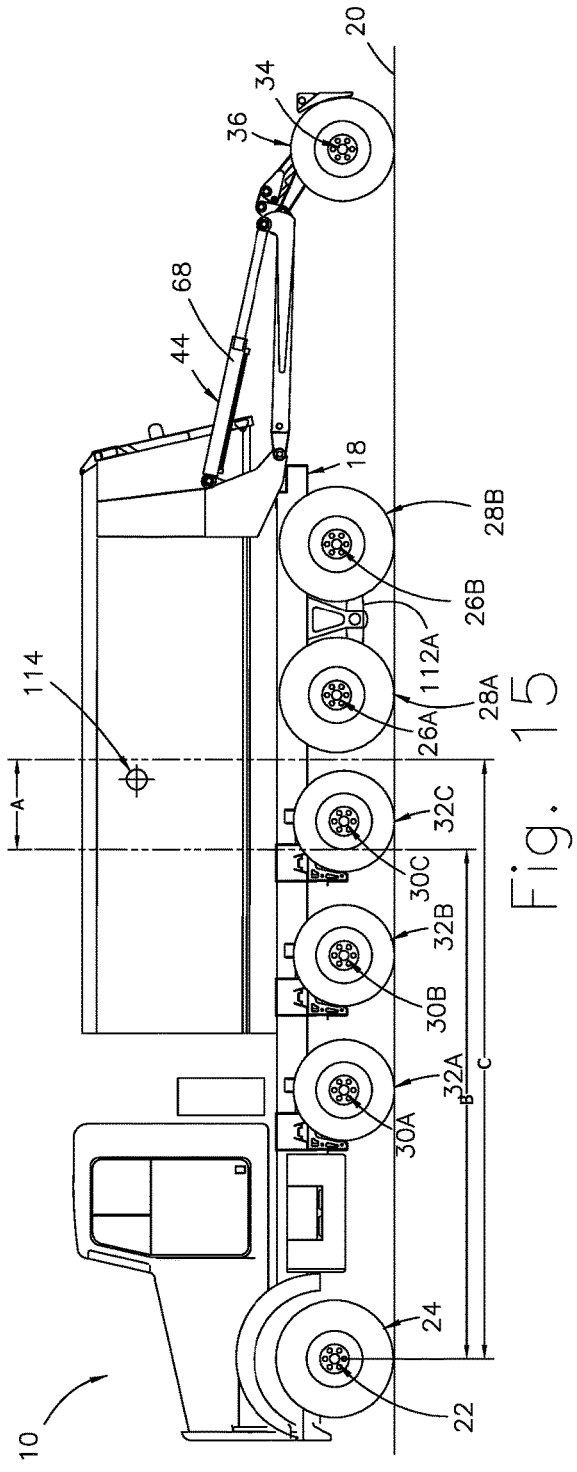

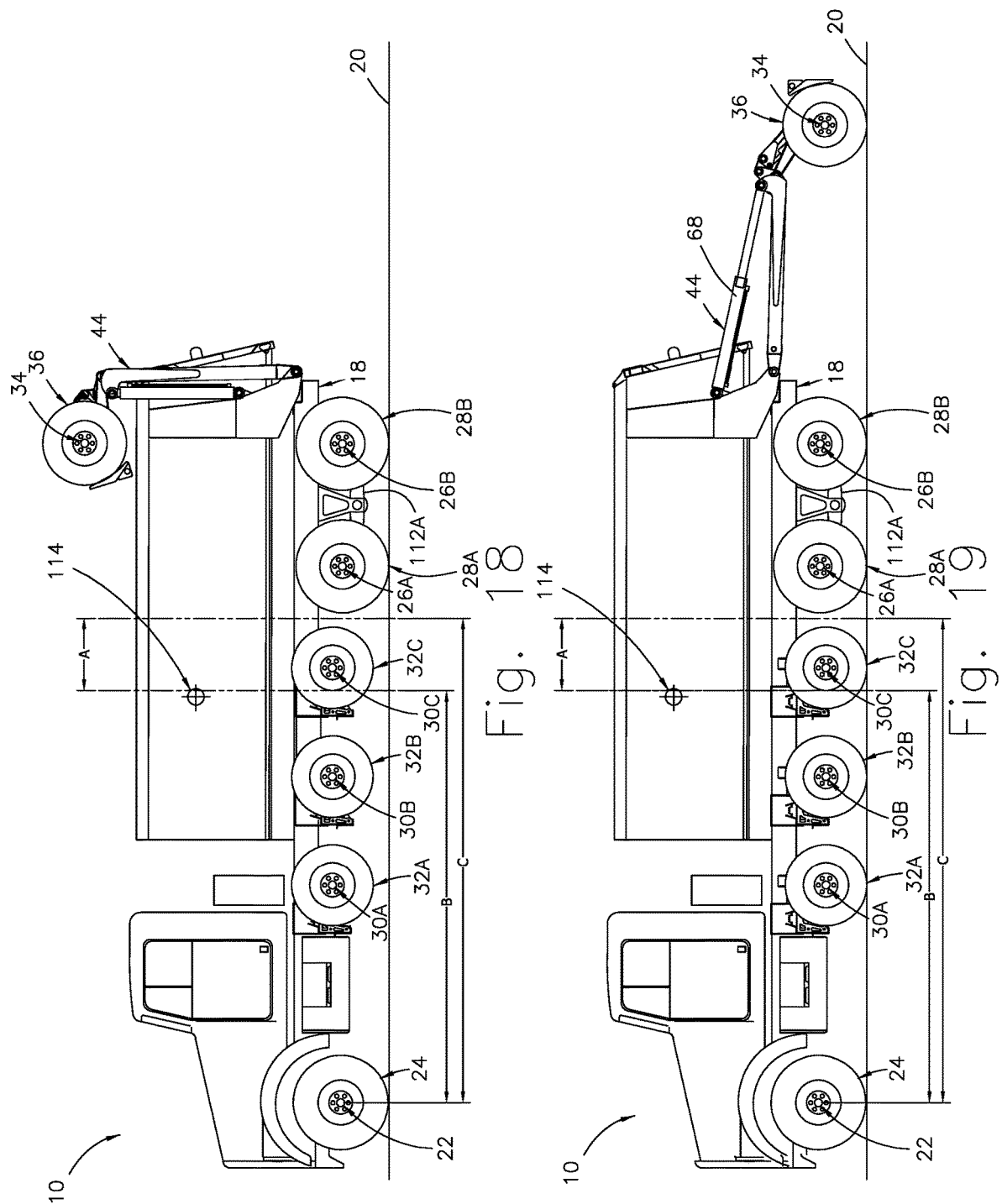

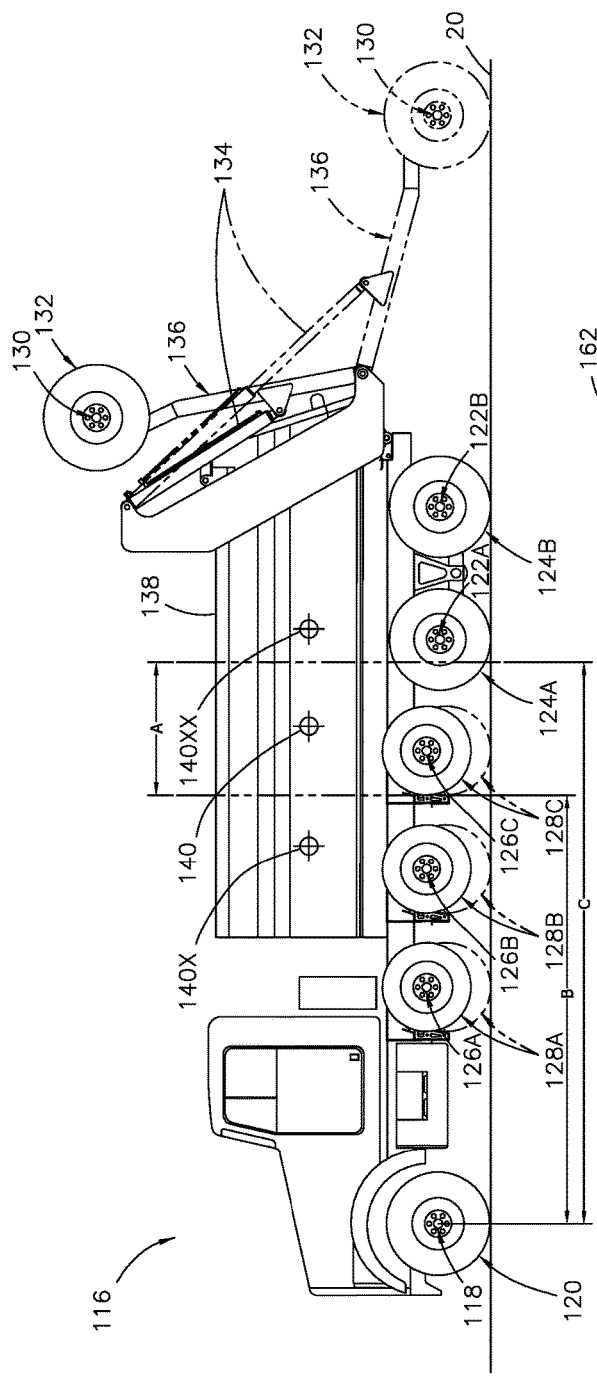
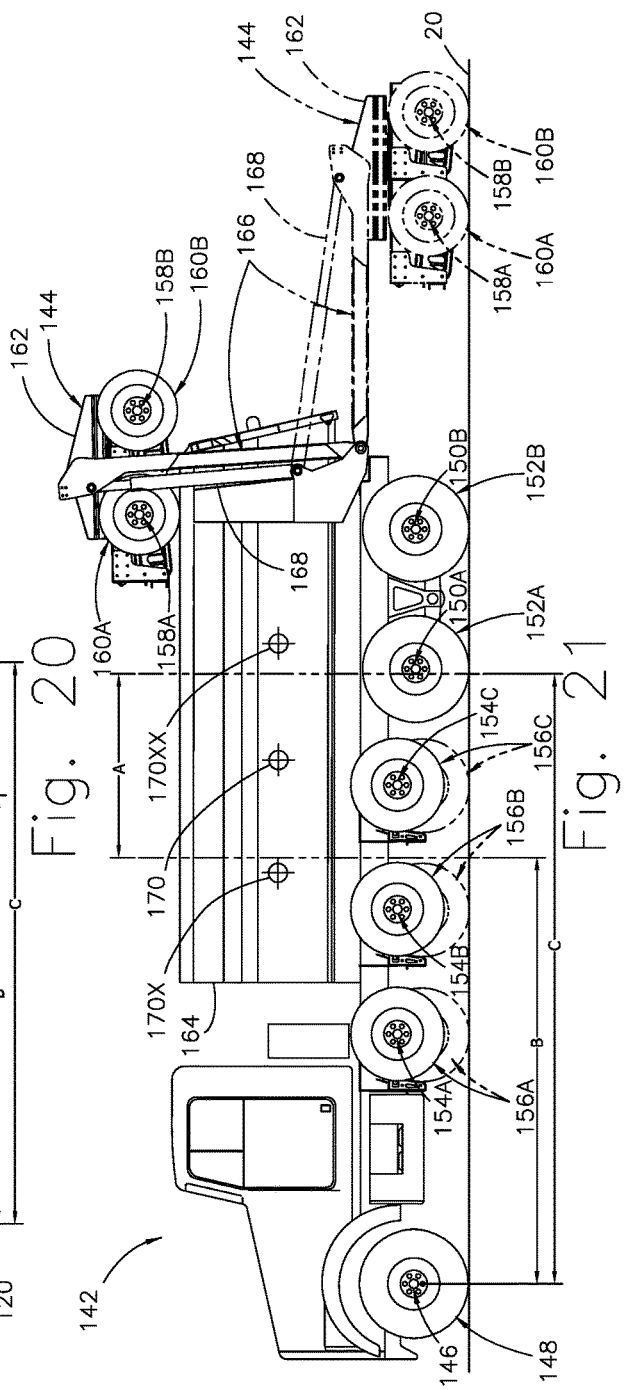

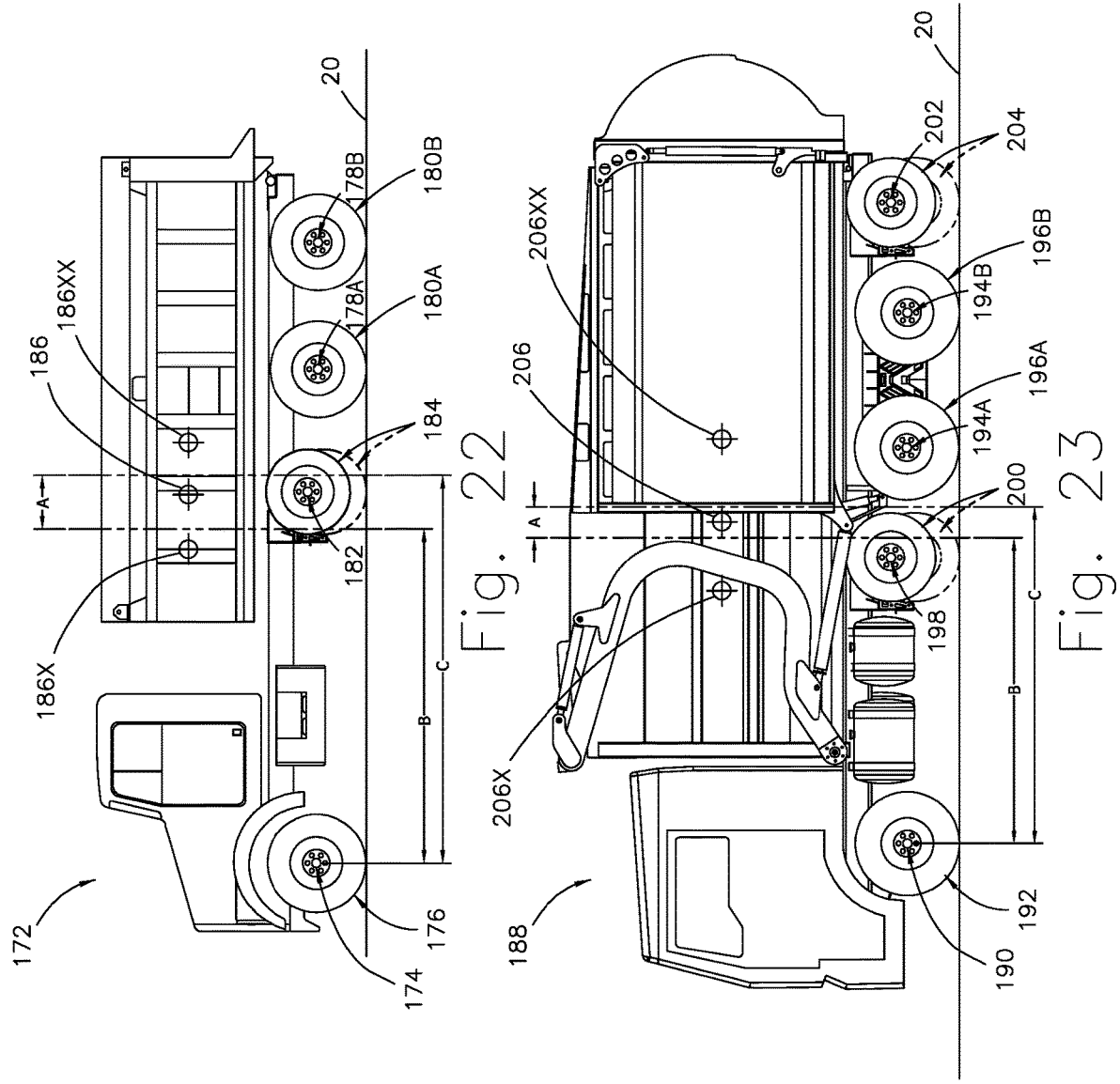

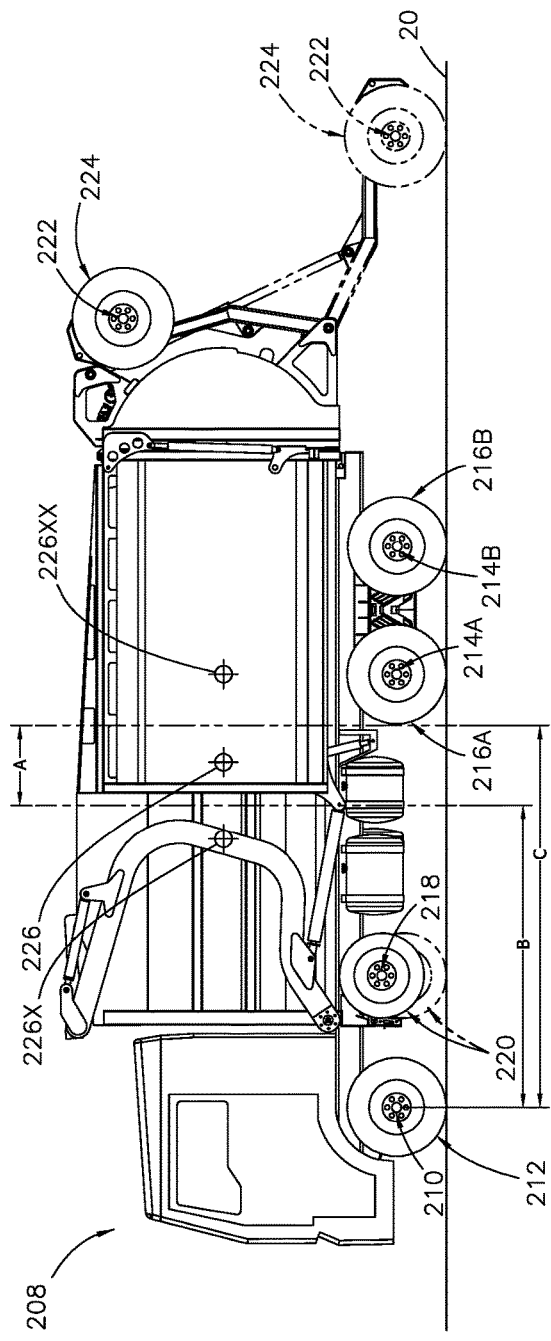
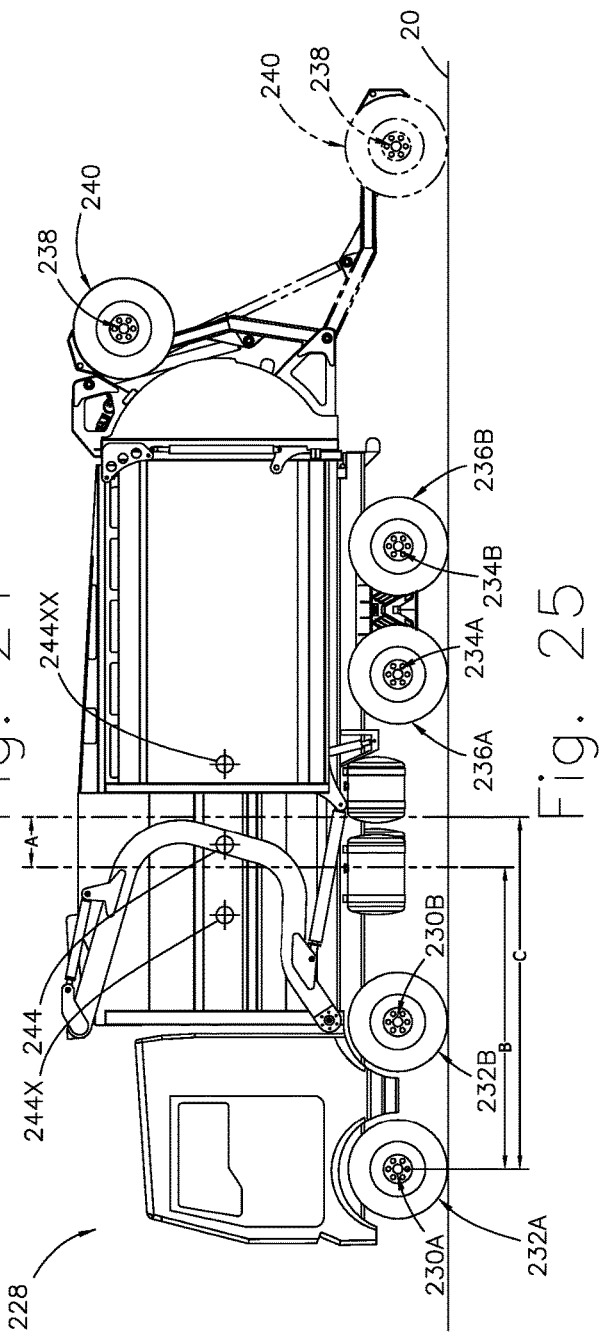

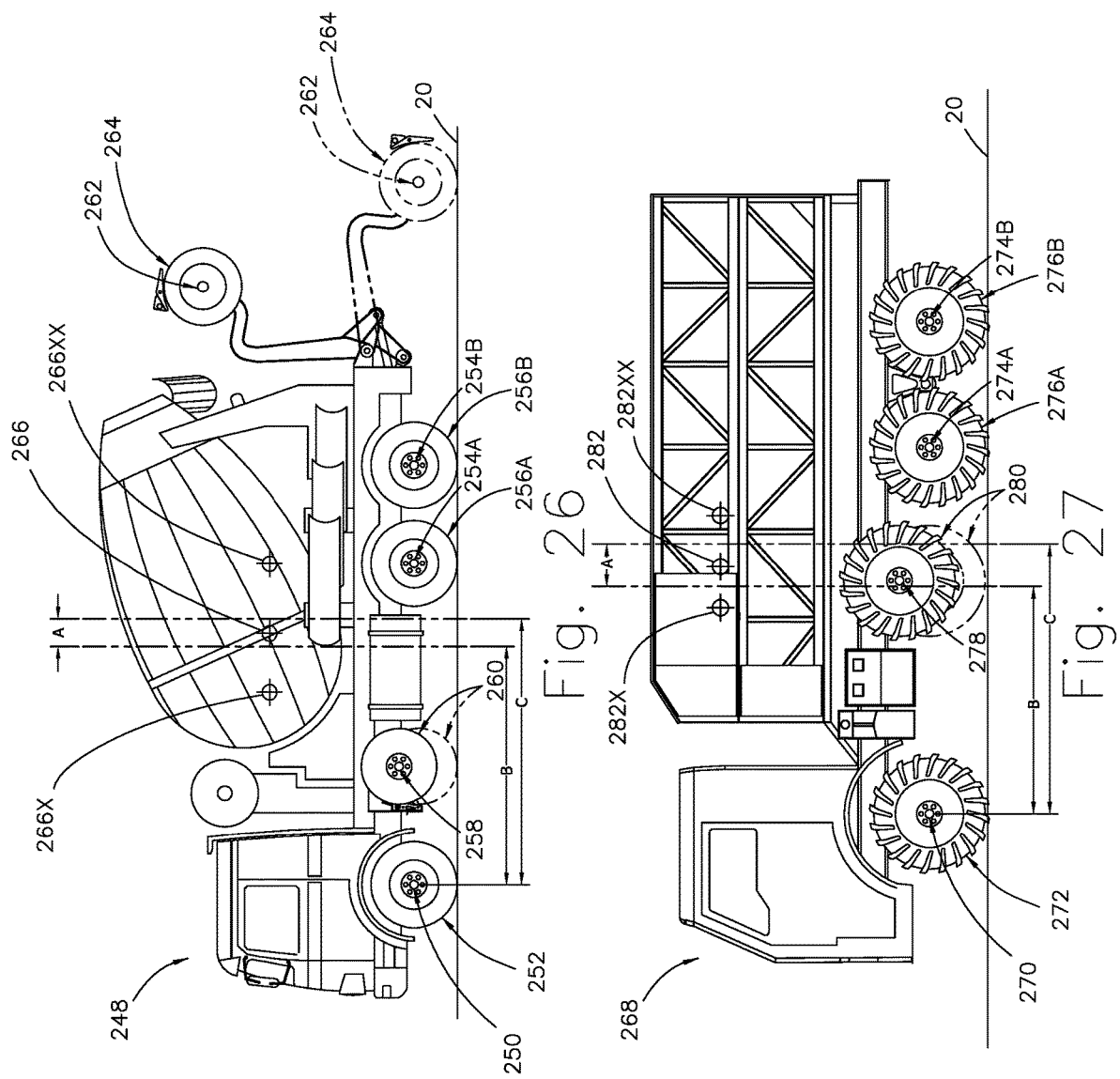

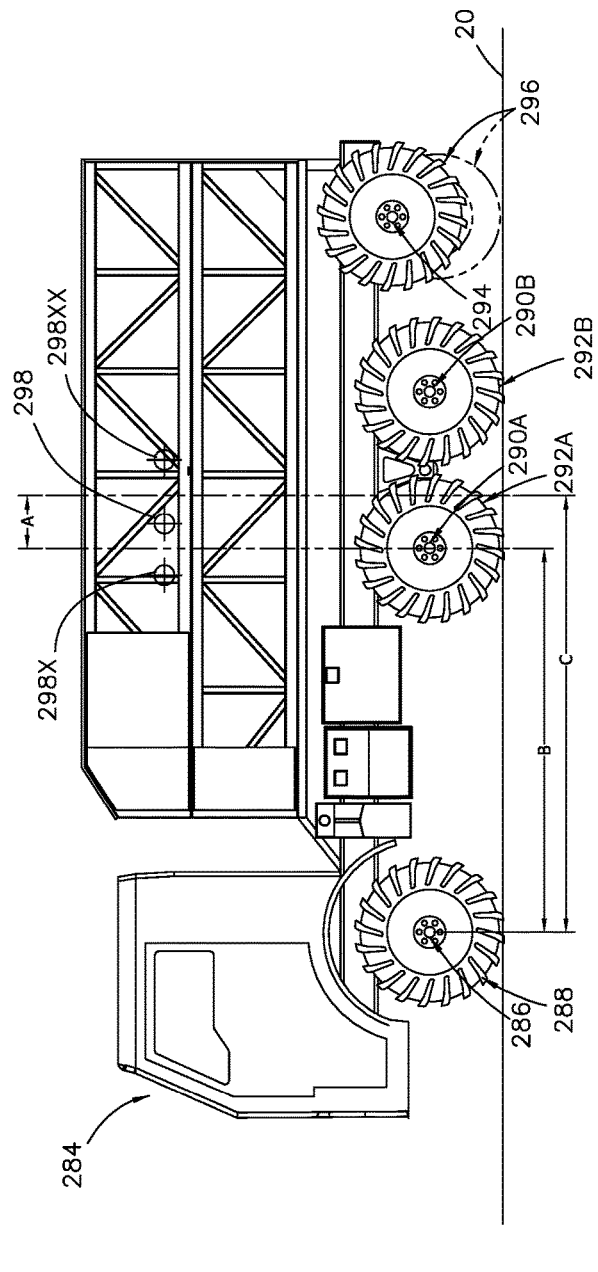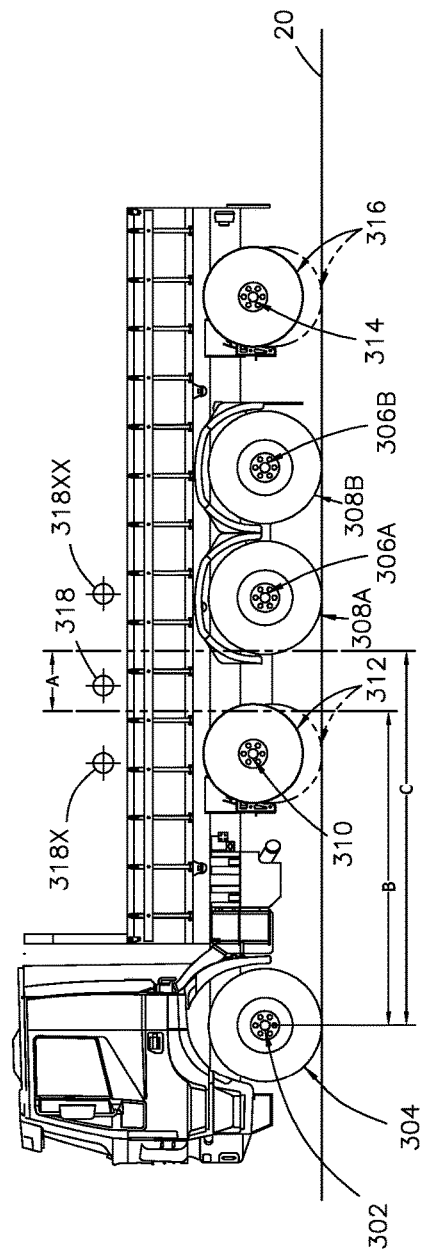

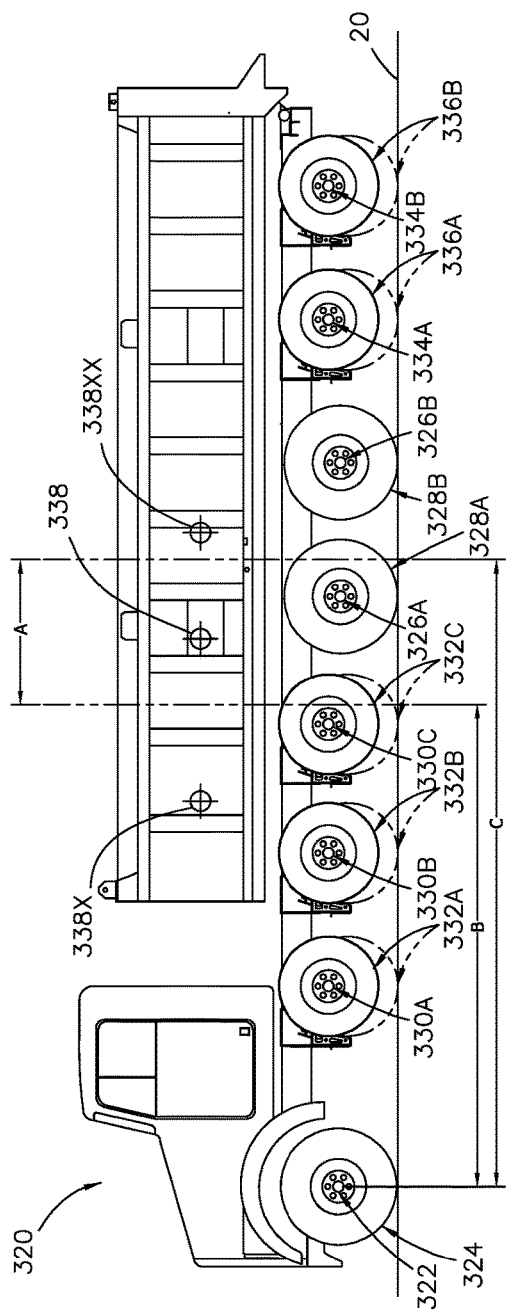
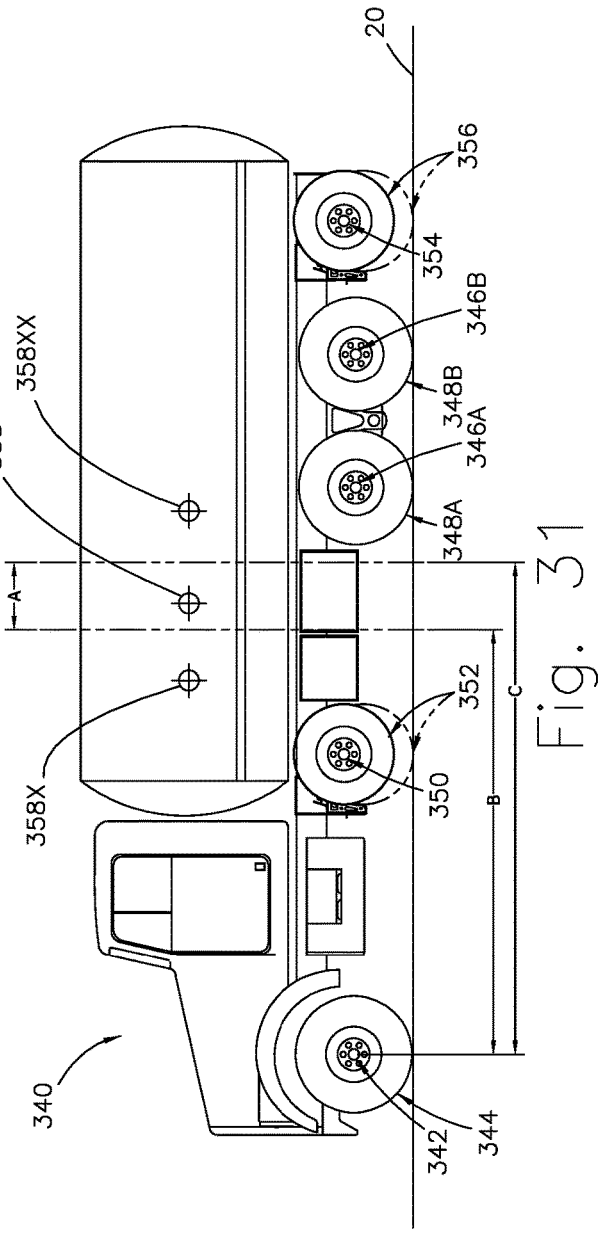

AXEL LOAD MONITORING SYSTEM

TECHNICAL FIELD

This invention relates to axle load monitoring systems and more particularly to axle loading monitoring and auxiliary axle usage with respect to load-transporting motor vehicles having one or more auxiliary axles and is related to U.S. Pat. No. 9,738,338 entitled "DUAL TRAILING AXLE SUSPENSION SYSTEM", U.S. Pat. No. 9,731,780 entitled "TRAILER HITCH", and U.S. Pat. No. 9,598,126 entitled "Automatic Auxiliary Axle Control System".

BACKGROUND OF THE INVENTION

Load-transporting motor vehicles such as dump trucks, refuse trucks, transit concrete mixing trucks, open-bed trucks, utility trucks, military trucks and other vehicles of various types to which a significant load may be added for transport are limited in their load transporting ability by various factors. Such as the weight bearing capacity of their supporting axles and applicable federal and state law. With such laws for example limiting the gross vehicle weight to 80,000 pounds, the weight carried by a single axle to 20,000 pounds and there being an exception as to consecutive axles that limits them to carrying a prescribed combined weight depending on their number and spacing. For example, the combined axle carrying weight is limited to 34,000 pounds regarding the two powered tandem axles that are typically employed with heavy duty load-transporting motor vehicles. And with such factors as a result impacting the use of load-transporting vehicles in that the more weight the vehicle can transport at a time, the more useful the vehicle can be provided other factors that impact the ability of the vehicle to perform in an acceptable manner are also considered. With such factors including the axle manufacturers rated load capacity.

And regarding load-transporting motor vehicles that carry significantly heavy loads, they typically have primary axles that continuously support the vehicle and one or more auxiliary axles that are available to assist in supporting such loads. Wherein the primary axles typically comprise a forwardly-located front axle with steerable wheels and one or more rearwardly-located powered axles. Whereas the auxiliary axles are deployable to help carry the weight of the vehicle and thereby reduce the weight carried by the primary axles and are herein referred to as either a pusher axle, tag axle or trailing axle to distinguish between them. With the understanding that a pusher axle is suspended from the vehicle chassis in a location to operate between a forwardly-located axle with steerable wheels and one or more rearwardly-located powered axles with wheels, a tag axle is suspended from the vehicle chassis to operate rearward of one or more powered axles but not normally beyond the rear end of the vehicle chassis. While a trailing axle (that has also been referred to as a tag axle and trailing tag axle) is also suspended from the vehicle chassis but in a manner to operate at a substantial distance rearward of the vehicle chassis.

Among the challenges faced in employing auxiliary axles, whether it is a pusher axle or a tag axle or a trailing axle, is in first determining whether auxiliary axle use is needed and then to what extent and then in determining the down force to be applied to the auxiliary axle (s) deployed and thereby the weight of the vehicle they carry. As this force determines the extent to which the primary axles then carry the weight of the vehicle while also continuing to serve as intended regarding vehicle performance such as in providing for suitable steerage, traction and braking. And in the equipping of a load-transporting motor vehicle with one or more auxiliary axles, their location and forced loading is commonly based on the typically expected load and the location of the resulting center of gravity of the vehicle and thus not well suited where there is a significant departure from what would be considered a normal load. Especially where the resulting center of gravity of the vehicle has shifted significantly from where it typically would be and can become a significant factor in shifting the weight on the supporting axles as weight added approaches the maximum allowed.

And apart from servicing, if a trailing axle is deployed but is not needed for additional vehicle support, it should be sufficiently forced downward for trailing axle stability as otherwise it would be serving no useful purpose and could adversely affect the road performance of the vehicle. While on the other hand, if one or more auxiliary axles are deployed with the addition of a load and forced to support the vehicle weight necessary to meet restrictions governing the weights carried by the primary axles, one or more of the primary axles while meeting the governing restrictions may be loaded beyond its acceptable weight-carrying capacity. Furthermore, when the wheels of an auxiliary axle that is acted on with a significantly low down-force passes over sudden elevation changes such as in the case of a pothole or dip in a road surface, there are sudden dynamic forces that can result and are applied to the axle that may not be compatible with the structural design of the axle and its suspension. Moreover, in the case of a trailing axle there may be insufficient down force regarding contributing to vehicle braking and roll stability as well as helping to support the vehicle.

Then at the other end of the spectrum, if one of the auxiliary axles whether it is a pusher axle or a tag axle or a trailing axle is down forced such that it accepts more vehicle weight than required to meet weight-carrying limits on the primary axles, one or more of the primary axles may lose its ability to adequately perform as intended. For example, adequate steerage and braking at a forward-most primary axle with steerable wheels and adequate traction and braking at one or more rearward-most primary axle with powered wheels.

In addressing these concerns and viewing currently available load-transporting motor vehicles, most do not have onboard scales for determining the existing vehicle weight or the existing weight on each axle. And those that do typically have onboard scale systems that calculate and display the vehicle weight but not the weight on the individual axles.

And in the case where there is no onboard weight scale system and no weight scales where a load is being added to the vehicle, the vehicle operator is left with determining whether an auxiliary axle needs to be activated and thus depends on the experience of the vehicle operator and especially where there is more than one auxiliary axle available and thus involves needing to make a selection. And the experience of the vehicle operator may or may not extend to handling a particular type of load or various types of loads with different densities or in the manner the load is received. That may be wholly at one time at a site or with additional loading at another site that also lacks weight scales. Moreover, the choice of whether to activate or deactivate any auxiliary axles is made even more difficult where the vehicle for example makes multiples stops to either drop off part of a load or pick up additional load before reaching the destination for off-loading.

Then in the case where the vehicle operator does recognize the need to activate one or more auxiliary axles based on experience or training or such is indicated by onboard weight scales or premeasured weights or weight scales at a pickup site, there remains the objective of tailoring the weight carried by an activated auxiliary axle in a significantly beneficial manner. As some auxiliary axles have only on/off capability wherein they apply a preset down force on the activated auxiliary axle that determines the amount of vehicle weight the axle carries/accepts. And this would require the vehicle operator to change the setting if possible for a certain weight if that appears to be needed from the standpoint of either increasing or decreasing the down force on a certain auxiliary axle and thereby the weight carried by this axle and resultantly the primary axle. But this is not a practical thing to do while on the road and in not knowing how much adjustment is needed for proper operation.

On the other hand, and in the case where there is provided the ability to adjust the down force on the auxiliary axles when they are activated, the auxiliary axles are typically operated with a pressured system that applies a down force to the axle that determines the vehicle weigh it accepts. And the adjustment is typically provided by the vehicle operator observing a pressure gauge connected to the system and operating a regulator valve to adjust the system pressure relying on pressure readings indicative of the down force on the axle that results. But without knowing the current weight on an auxiliary axle or having some means to determine such, it is not known how much down force to add or subtract and again the vehicle operator is left with making that decision based on experience and/or training and doing the adjusting correctly.

And even with a vehicle having onboard weight scales and providing the vehicle operator with the ability to adjust the down forces on the auxiliary axles as described above, these weight scales typically display the weights on the primary axles (front axle and powered axles) but not that on any auxiliary axles such as a pusher axle, a tag axle and a trailing axle. And where there is more than one auxiliary axle, the vehicle operator may need to adjust them individually in ensuring that all the axles comply with certain applicable restrictions. And that requires the vehicle operator needing to know the applicable law that applies to both vehicle weight and weight carried by the different axles and groups of axles and to then adjust each auxiliary axle as needed while calculating the vehicle weight and the weight on the various axles. Because if this is not done correctly and though the vehicle with the auxiliary axles deployed would appear to be in compliance with all applicable laws, this could be a costly incorrect assumption.

Various approaches have been offered in addressing some of these challenges including that disclosed in U.S. Pat. No. 5,193,063 that is directed at load-transporting vehicles with one auxiliary axle and U.S. Pat. No. 6,371,227 that is directed at load-transporting vehicles with multiple auxiliary axles comprising pusher axles and a trailing axle. And while such approaches have addressed some of the challenges faced, there remains a desire for an axle load monitoring system and especially one that could also propose suitable auxiliary usage applicable to the vehicle loading encountered such that all the axles supporting the vehicle are conditioned in so far as possible in meeting the working objectives of the respective axles as well as complying with applicable federal and state regulations.

SUMMARY OF THE INVENTION

The present invention provides an axle load monitoring system for load-transporting motor vehicles having two or more primary axles and one or more auxiliary axles wherein the monitoring system is adapted to detect a noncompliant axle loading condition when the weight of the vehicle carried by any one of the primary axles supporting the vehicle exceeds a prescribed maximum allowable axle carrying weight assigned thereto and also when the weight carried by a group of the axles arranged consecutively and supporting the vehicle exceeds a prescribed maximum allowable axle group carrying weight assigned to the group. With the monitoring system on any such detection adapted to recommend auxiliary axle usage that would result in the maximum allowable axle carrying weight and maximum allowable axle group carrying weight not being exceeded provided the current gross vehicle weight does not exceed a prescribed maximum allowable gross vehicle weight determined by all the axles and the current center of gravity of the vehicle is located within a certain compliance-manageable range. And with the monitoring system also adapted to apply state and/or federal law to the maximum allowable axle and axle group carrying weight and gross vehicle weight.

Moreover, the monitoring system is adapted to recommend auxiliary axle usage that would result in the weight carried by the supporting axles being not less than a minimum allowable carrying weight assigned thereto and located in an optimum weight-carrying range assigned thereto. Furthermore, the monitoring system is adapted to provide information that would provide for optimal auxiliary axle usage based on auxiliary axle availability including when the current gross vehicle weight exceeds the maximum allowed and when the current center of gravity of the vehicle is outside the compliance-manageable range. In addition, the monitoring system is adapted to recommend stowing an auxiliary axle when not be being utilized or its usage is found to be no longer needed. And the monitoring system is also adapted to provide information to the vehicle operator regarding certain matters including the status of auxiliary axle operation, the weight on the axles then supporting the vehicle, the gross vehicle weight, whether there is compliance with applicable state and federal law, and information that the operator can address and deal with in an appropriate manner.

These and other features of the invention are disclosed in the accompanying drawings and description of exemplary embodiments of the invention.

DESCRIPTION OF THE DRAWINGS

FIGS. 6-15 are side views of the dump truck in FIG. 1 illustrating the results obtained employing information provided by the axle load monitoring system as load is added to the truck.

FIGS. 16-19 are side views of the dump truck in FIG. 1 illustrating when it is not possible to obtain the desired weight distribution between the primary axles and auxiliary axles when the vehicle is loaded such that the existing center of gravity of the vehicle is located outside of a certain manageable range.

FIG. 20 is a side view of another dump truck provided with the axle load monitoring system according to the present invention wherein the truck is like that in FIG. 1 but has the operating cylinders of the trailing axle suspension system connected in a different manner with the truck.

FIG. 21 is a side view of a dump truck and trailer provided with the axle load monitoring system wherein the truck has three pusher axles and the trailer has a pair of supporting axles that also serve as trailing axles in helping to support the dump truck.

FIG. 22 is a side view of another dump truck provided with the axle load monitoring system according to the present invention wherein the truck has one pusher axle.

FIG. 23 is a side view of a refuse-transporting truck provided with the axle load monitoring system according to the present invention wherein the truck has a pusher axle and a tag axle.

FIG. 24 is a side view of another refuse-transporting truck provided with the axle load monitoring system according to the present invention wherein the truck has a pusher axle and a trailing axle.

FIG. 25 is a side view of another refuse-transporting truck provided with the axle load monitoring system according to the present invention wherein the truck has a pair of axles with steerable wheels and a trailing axle.

FIG. 26 is a side view of a transit-mixer truck provided with the axle load monitoring system according to the present invention wherein the truck has a pusher axle and a trailing axle.

FIG. 27 is a side view of a military load-transporting truck provided with the axle load monitoring system according to the present invention wherein the truck has a pusher axle.

FIG. 28 is a side view of another military load-transporting truck provided with the axle load monitoring system according to the present invention wherein the truck has a tag axle.

FIG. 29 is a side view of an open-bed load-transporting truck provided with the axle load monitoring system according to the present invention wherein the truck has a pusher axle and a tag axle.

FIG. 30 is a side view of another open-bed load-transporting truck provided with the axle load monitoring system according to the present invention wherein the truck has three pusher axles and two tag axles.

FIG. 31 is a side view of a liquid-transporting truck provided with the axle load monitoring system according to the present invention wherein the truck has a pusher axle and a tag axle.

DESCRIPTION OF EXEMPLARY EMBODIMENTS

Figure 1:
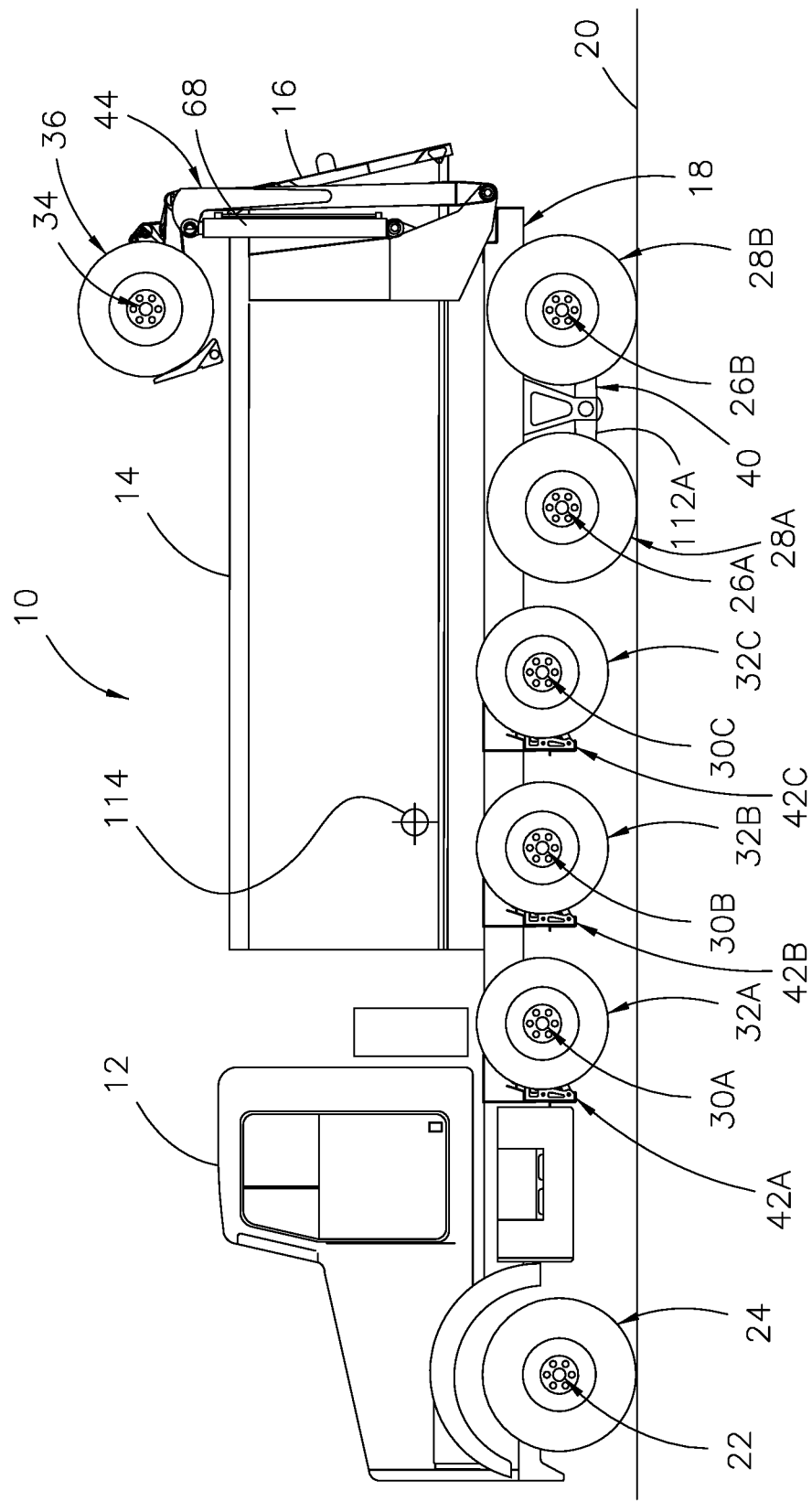
FIG. 1 is a side view of a dump truck provided with the axle load monitoring system according to the present invention wherein the truck has primary axles consisting of a front axle and powered tandem axles and auxiliary axles consisting of three pusher axles and a trailing axle that are shown in their stowed condition.

Referring to FIGS. 1-19, the present invention is disclosed as applied to a load-transporting motor vehicle in the form of a dump truck 10 having a cab 12 that serves as a vehicle operator and passenger compartment and a tiltable dump body 14 that serves as a load container and has a tail gate 16 for releasing a load when the dump body is tilted. With the cab and tiltable dump body mounted on a chassis 18 and the chassis in turn supported on a road surface 20 by both primary axles and deployable auxiliary axles. With the primary axles consisting of a forwardly-located axle 22 with steerable wheels 24 and rearwardly-located powered tandem axles 26A and 26B with dual wheels 28A and 28B respectively at their outboard ends. And with the auxiliary axles consisting of three pusher axles 30A, 30B and 30C with wheels 32A, 32B and 32C respectively, and a trailing axle 34 with wheels 36.

And to aid in understanding the important role that the axle load monitoring system according to the present invention plays in strategically distributing the vehicle weight between all the supporting axles available in a manner suited to utilizing their contribution to vehicle operation in an advantageous manner, there will now be described their manner of suspension and relationship. Wherein the front axle 22, tandem axles 26A and 26B, pusher axles 30A, 30B and 30C and trailing axle 34 are suspended from laterally spaced locations on the truck chassis 18 by suspension systems 38, 40, 42A, 42B, 42C and 44 respectively. See FIGS. 2-5. With the front axle 22 located beneath the truck chassis 18 and adjacent the front end thereof with its wheels 24 pivotally mounted in a conventional manner on the ends of the axle and linked together by a tie rod 46 and steered from the cab with a steering wheel 48 by the vehicle operator acting through a steering gear arrangement (not shown) of a suitable conventional type. Whereas the tandem axles 26A and 26B are located beneath the truck chassis 18 under a rear end-portion of the dump body 14 and are powered and thus their wheels 28A and 28B by a power train (not shown) of a suitable conventional type that includes an engine and transmission that are controlled from the cab by the vehicle operator.

Continuing with the axle suspension systems, both the front axle suspension system 38 and tandem axles suspension system 40 are parallel leaf-spring suspensions of a suitable conventional type with the tandem axles suspension system being of the walking-beam type that permits the wheels 28A and 28B of the tandem axles to move up and down relative to each other to a significant extent in passing over bumps and depressions in the surface being traveled. And then as to the auxiliary axles, the pusher axles 30A, 30B and 30C are suspended directly from the truck chassis 18 by their respective suspension systems 42A, 42B and 42C between the front axle 22 and tandem axles 26A and 26B. And the trailing axle 34 is also suspended from the truck chassis 18 but via the dump body 14 and is deployable to operate as shown in FIGS. 7-19 at a significant distance rearward of the rearmost primary axle (axle 26B) that can be 10-13 feet with the trailing axle suspension system 44.

Figure 2:
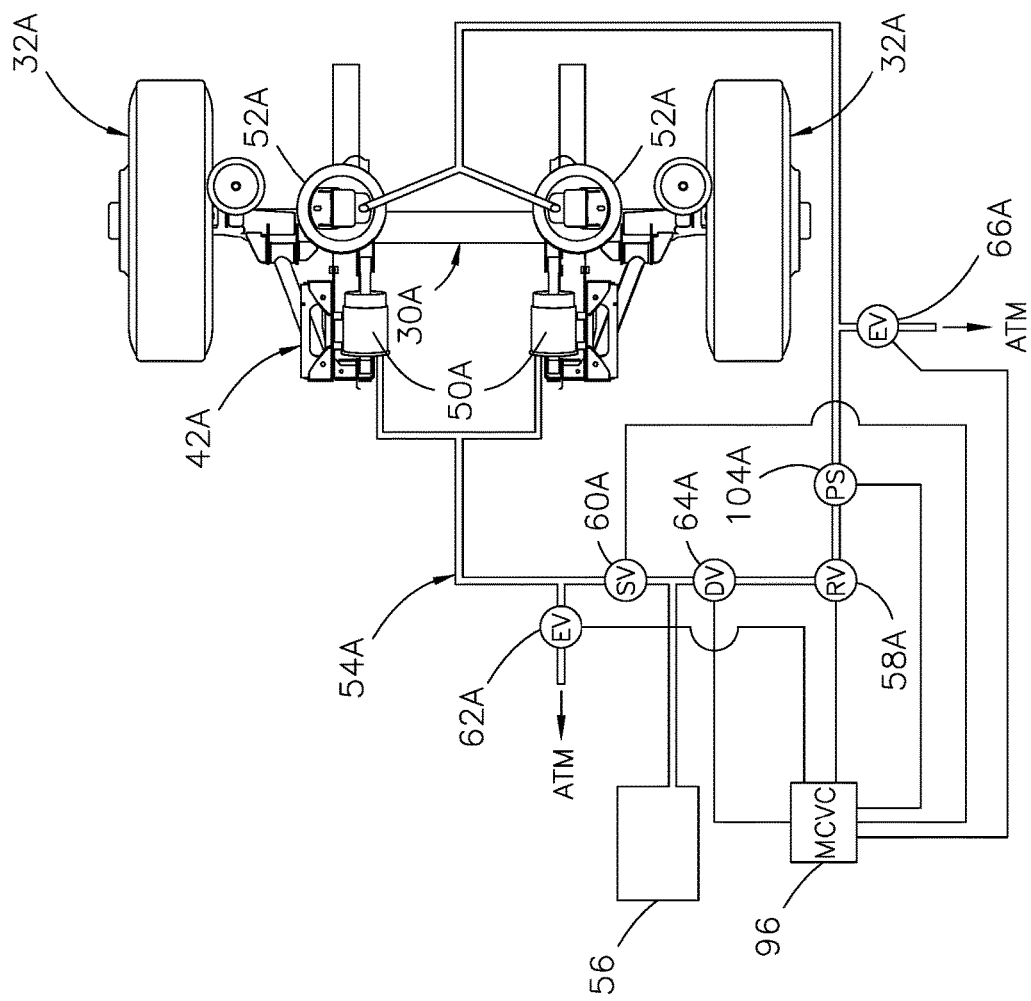
FIG. 2 is an overhead view of one of the pusher axle suspension systems in FIG. 1.
Figure 4:
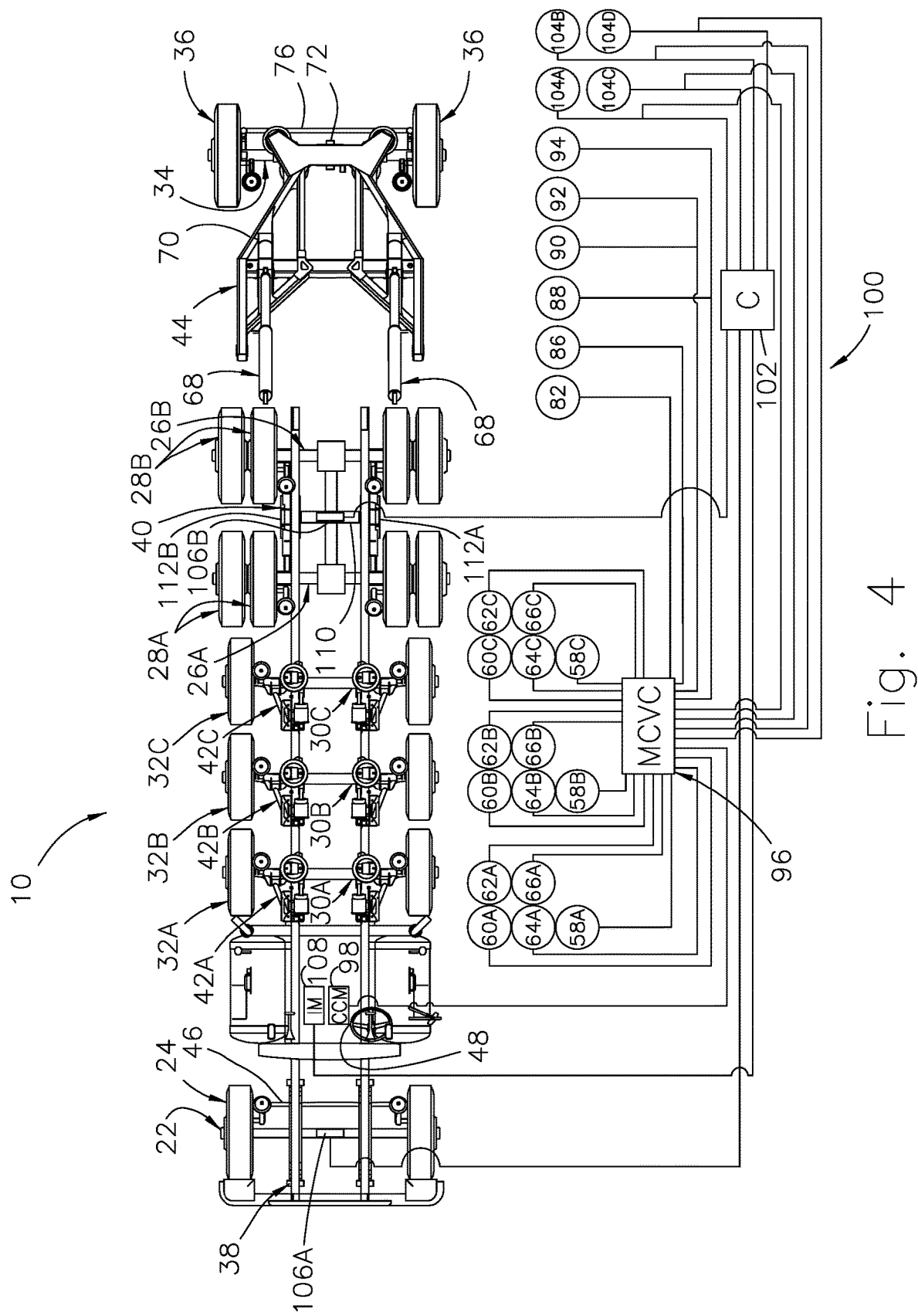
FIG. 4 is an overhead view exposing the axles and associated suspension systems of the truck in FIG. 1 and includes a schematic of the axle load monitoring system according to the present invention as associated therewith and wherein a single weight sensor is employed om the powered tandem axles suspension system and there is also included a schematic of an auxiliary axle monitoring system that actually monitoring s the operation of the auxiliary axles.
Figure 5:
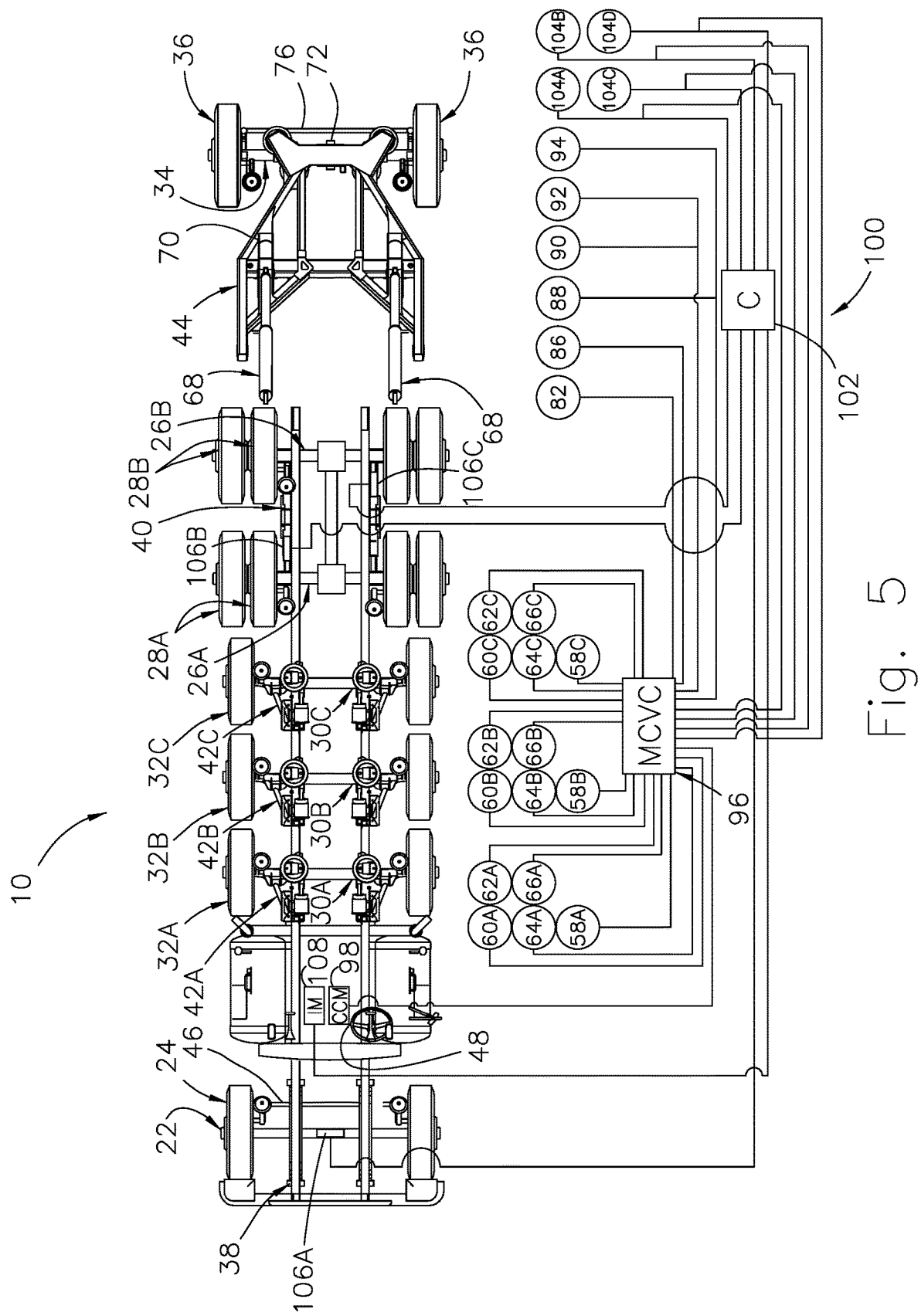
FIG. 5 is view like FIG. 4 wherein two weight sensors are employed in the powered tandem axle suspension system.

Describing now the pusher axle suspension systems 42A, 42B and 42C, they are also of a suitable conventional type with the components associated with the operation of each of the pusher axles shown FIG. 2 with respect to the pusher axle suspension system 42A and with the understanding that such also applies to the corresponding components of the other pusher axle suspension systems 42B and 42C using the same reference numbers but with the suffix letters B and C to the extent they are shown in FIGS. 4 and 5.

As shown in FIG. 2, the pusher axle suspension system 42A includes laterally spaced axle-stowing pneumatically-controlled cylinders 50A and axle-deploying pneumatically-controlled air springs 52A of the elastomeric bag type under the control of a control circuit 54A that effects the stowing and deploying of the pusher axle 30A and the loading of the axle while deployed. Wherein the control circuit 54A comprises an air pressure accumulator tank 56, a pressure regulator valve (RV) 58A, an axle-stowing valve (SV) 60A and operatively-associated exhaust valve (EV) 62A, and an axle-deploying valve (DV) 64A and operatively-associated exhaust valve (EV) 66A. With the air pressure accumulator tank 56 in addition to supplying air under pressure for the control circuit 54A, also supplying the other pusher axle control circuits 54B and 54C as well as other pneumatically-operated vehicle components and for such purposes is supplied on demand by an engine driven air compressor (not shown) with the pressure maintained in the air tank at a pressure suitable to meet the demands of all the pneumatically-operated systems it serves.

And wherein all the valves in the control circuit 54A are of a conventional electronically-controlled type with the exhaust valve (EV) 62A when opened exhausting the air pressure downstream of the axle-stowing valve (SV) 60A to the atmosphere (ATM) and the exhaust valve (EV) 66A when opened exhausting the air pressure downstream of the axle-deploying valve (DV) 64A to the atmosphere (ATM). And with the pressure regulator valve 58A being operable to vary the air pressure downstream in accordance with a controlled voltage input as further described later.

Describing now the operation of the pusher axle suspension system 42A that is available with the associated control circuit 54A as further described later, the pusher axle 30A is established in a stowed inactive condition as shown in FIGS. 1 and 6 by opening the axle-stowing valve 60A while closing the exhaust valve 62A and by closing the axle-deploying valve 64A while opening the exhaust valve 66A. Thereby pressurizing the pusher axle stowing cylinders 50A and exhausting the pusher axle deploying air springs 52A of air pressure whereby the cylinders 50A position and hold the pusher axle 30A in the stowed inactive condition while the air springs 52A allow such action.

The pusher axle 30A is deployed and established in an active condition as shown in FIG. 7 by closing the pusher axle-stowing valve 60A while opening the exhaust valve 62A and by opening the pusher axle-deploying valve 64A while closing the exhaust valve 66A. Thereby exhausting the cylinders 50A and pressuring the air springs 52A. Whereby the pusher axle 30A is deployed by the air springs 52A and is then in an active condition wherein the air springs 52A force the pusher axle to accept a portion of the vehicle weight. With the applied force on the pusher axle 30A determined by the regulated air pressure applied to the air springs 52A according to the pressure established by the regulator valve 58 as further described later. And then on subsequent opening of the axle-stowing valve 60A while closing the exhaust 62A valve and by closing the axle-deploying 64A while opening the exhaust valve 66A, the pusher axle 30A is returned to its stowed inactive condition in completing the cycle of operation of the pusher axle 30A.

Figure 3:
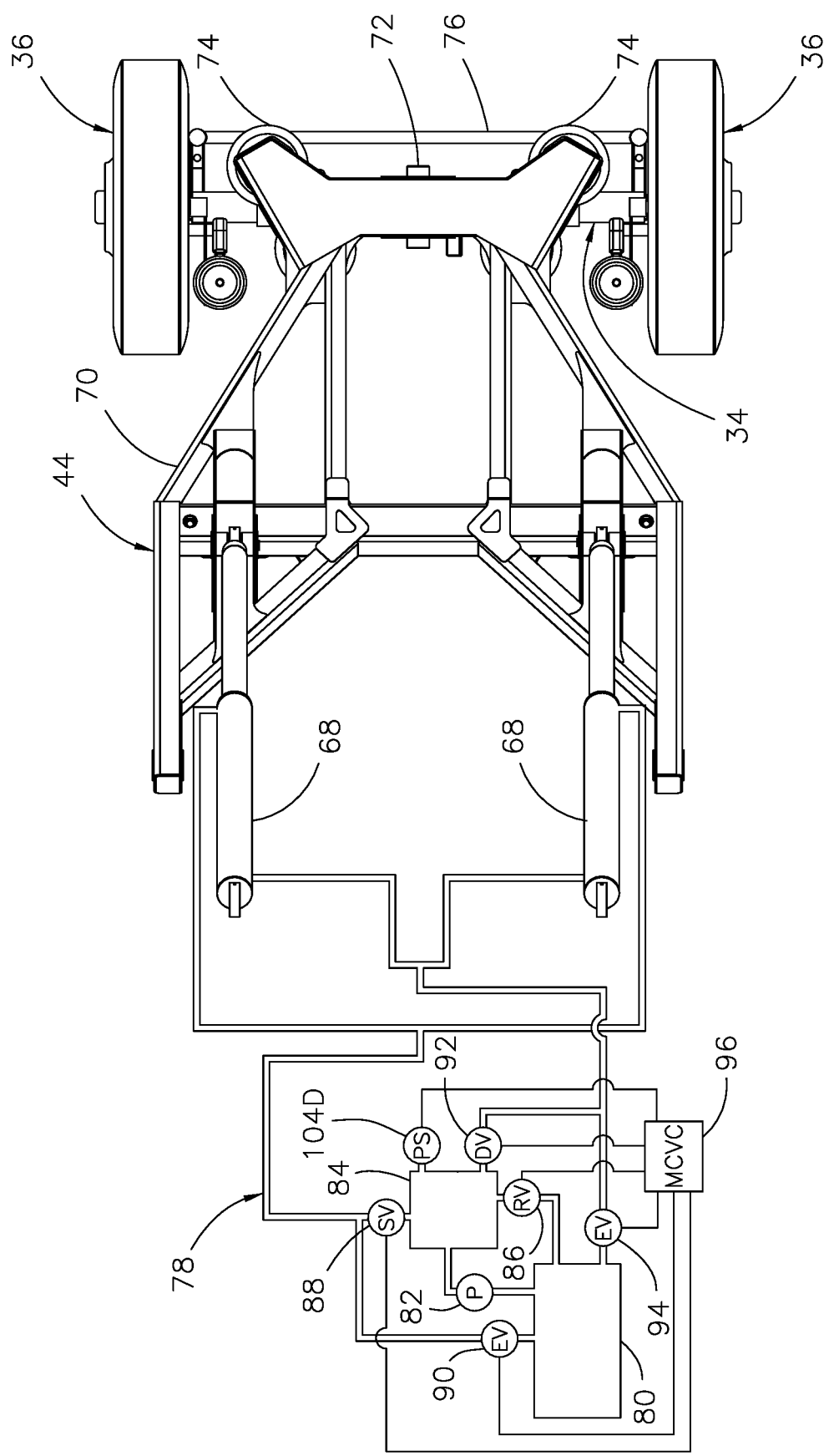
FIG. 3 is an overhead view of the trailing axle suspension system in FIG. 1 with the trailing axle deployed.

Turning now to the trailing axle 34 and referring to FIGS. 1, 3 and 6, the trailing axle suspension system 44 is like that in U.S. Pat. No. 7,775,308 and includes a pair of laterally spaced actuators 68 that incorporate a gas spring and are pivotally connected at one end to a carriage 70 and at the opposite end to the dump body 14 and thereby to the truck chassis 18. And wherein the trailing axle 34 is directly suspended from the carriage 70 with a centrally located pivotal connection 72 and air springs 74 that cushion the pivotal movement allowable of the trailing axle relative to the carriage. Whereby the carriage 70 is pivotally connected to the tiltable dump body 14 and thereby to the truck chassis to provide for the trailing axle to be swung by the actuators 68 between its stowed inactive condition shown in FIG. 1 and its deployed active condition shown in FIG. 6. And with the trailing axle 34 in the active condition, the trailing axle wheels 36 track the turning movement of the truck by being pivotally mounted on the ends of the axle and linked together by a tie rod 76.

The actuators 68 are under the control of a hydraulic circuit 78 as shown in FIG. 3 that comprises a vented hydraulic tank 80, a hydraulic pump (P) 82 that operates on demand, a manifold 84, a pressure regulator valve (RV) 86 that returns excess hydraulic fluid at the manifold to the tank in regulating the pressure being supplied for suspension operation, an axle-stowing valve 88 and operatively associated exhaust valve (EV) 90, and an axle-deploying valve (DV) 92 and operatively associated exhaust valve (EV) 94. And wherein all the valves in the hydraulic circuit 78 are of a conventional electronically-controlled type and with the pressure regulator valve 86 being operable to vary the hydraulic pressure downstream thereof in accordance with a controlled voltage input as further described later.

Describing now the operation of the trailing axle suspension system 44 that is available with the hydraulic circuit 78 as thus far described, the trailing axle 34 is established in its stowed inactive condition by opening the axle-stowing valve 88 while closing the exhaust valve 90 and by closing the axle-deploying valve 92 while opening the exhaust valve 94. Whereby the trailing axle is then positioned and held in a stowed inactive condition as shown in FIG. 1. And then on closing the axle-stowing valve 88 while opening exhaust valve 90 and opening the axle-deploying valve 92 while closing exhaust valve 94, the trailing axle 34 is deployed and established in an active condition as shown in FIG. 6. Wherein the trailing axle 34 is then forced to accept a portion of the vehicle weight determined by the regulated pressure established by the regulator valve 86 as further described later. And then on opening the axle-stowing valve 88 while closing the exhaust valve 90 and closing the axle-deploying valve 92 while opening the exhaust valve 94, the trailing axle is returned to its stowed inactive condition.

In addition to what has been described with respect to the various axles, it will also be understood that the front axle wheels 24, tandem axle wheels 28A and 28B, pusher axle wheels 32A, 32B and 32C and trailing axle wheels 36 have conventional air-operated service brakes. Whose braking ability is addressed by the present invention in providing for suitable weights being carried by all the axles that are supporting the vehicle with added load as further described later.

And to further aid in understanding the challenges faced in efficient use of all the axles, the primary axles typically have a maximum weight-carrying capacity substantially greater than that of any of the auxiliary axles, and a trailing axle typically has a weight-carrying capacity that is less than that of the primary axles but greater than that of a pusher axle and tag axle. For example and with respect to the dump truck 10, (a) the maximum allowable weight carried by the front axle 22 may be 20,000 pounds as prescribed by federal regulations but also have a minimum allowed carrying weight not less than 14,000 pounds for desired operational effectiveness including steerage and braking as well as vehicle support, (b) the tandem axles 26A and 26B may have a combined maximum allowable carrying weight of 34.00 pounds as prescribed by federal regulations relating to a group of consecutive axles but also have a combined minimum allowable carrying weight not less than 26,000 pounds for desired operational effectiveness including traction and braking as well as vehicle support, (c) the pusher axles 30A, 30B and 30C that are employed may each have a maximum allowable carrying weight of 8,000 pounds but also have a minimum allowable carrying weight not less than 1,500 pounds for desired operational effectiveness including braking as well as vehicle support, and (d) the trailing axle 34 employed may have a maximum allowable carrying weight of 13,000 pounds but also have a minimum allowable carrying weight not less than 2,500 pounds for desired operational effectiveness including braking and vehicle stability as well as vehicle support. And these circumstances are also addressed by the present invention as described later.

Moreover, the weight carried by the front axle 22 and tandem axles 26A and 26B from the standpoint of durability in adequately performing their duty as the primary axles may have an optimum range of carrying weight within the range of their maximum and minimum allowable carrying weights and especially when the weight of the vehicle is approaching a maximum allowable gross vehicle weight determined by the number of axles and their grouping such as when applying state and federal law. Wherein the optimum weight sought to be carried by the front axle 22 and the tandem axles 26A and 26B may be substantially midway of their maximum and minimum allowable carrying weights while the auxiliary axles are maintained within their allowable range of carrying weights. And in the case of multiple auxiliary axles, not all those available may be required to accomplish this depending on the then existing vehicle weight and the location of the then existing center of gravity of the vehicle. And these circumstances are also addressed by the present invention as described later.

All the above considerations as well as others of significance are addressed by the present invention in determining auxiliary axle usage and to what extent whether there is only one auxiliary axle or multiple auxiliary axles. And this includes complying with applicable state and federal law when so directed that for example limit the weight on an individual axle to 20,000 pounds and that on a group of two consecutive axles to 34,000 pounds as previously indicated and limit the gross vehicle weight to a certain weight depending on all the axles supporting the vehicle including auxiliary axles. And with the goal of the present invention being to provide optimal auxiliary axle usage in view of the above considerations and that depends on the actual situation having to be dealt with as will become more apparent from the adaptation of the invention to various load-transporting motor vehicle axle arrangements.

And in considering the dump truck 10 with its existing auxiliary axle control circuits 54A, 54B, 54C and 78, they are managed by a Master Control Valve Center (MCVC) 96 that is mounted on the truck 10 and linked as shown with the auxiliary axle control circuits and with a Central Command Module (CCM) 98 which is located in the cab 12 for direct access by the vehicle operator. See FIGS. 2-5. Whereby a vehicle operator can manually effect at the Central Command Module (CCM) 98 selective stowing and selective deployment and loading of the auxiliary axles and with such loading being to the degree available with each auxiliary axle and guided by suitable instrumentation, tables and/or charts. And it will also be understood that the deployment and loading of the auxiliary axles can also be provided by vehicle operator access directly to the auxiliary axle control circuits where a Central Command Module or equivalent auxiliary axle usage management is not provided.

Describing now the Axle Load Monitoring System (ALMS) 100 according to the present invention as applied to the dump truck 10 and with reference to FIGS. 2-5, the ALMS utilizes a Computer (C) 102 that is installed in the cab 12 or other location on the truck readily available to the vehicle operator and utilizes (1) certain information provided to the Computer 102 as described later, (2) auxiliary axle loading information provided to the Computer 102 by electronic pressure sensors (PS) 104A, 104B, 104C and 104D (see FIGS. 2-5), and (3) primary axle loading information provided to the Computer 102 by electronic weight sensors (WS) 106A and 106B (see FIG. 4) or 106A, 106B and 106C (see FIG. 5). Wherein the pressure sensors 104A, 104B, 104C and 104D are separate from the pressure regulator valves 58A, 58B, 58C and 86 respectively and connected to both the Master Control Valve Center (MCVC) 96 and Computer 102 as shown or incorporated in the respective regulator valves in providing regulated pressure feedback for their operation in providing the desired pressure to load the respective auxiliary axles 30A, 30B, 30C and 34 and also optional monitoring of the resulting loading on the respective auxiliary axles as further described later. And wherein the Computer 102 is also linked with an Informational Module (IM) 108 that is located in the cab 12 and is adapted to receive information for the vehicle operator from the Computer 102 as described later.

The pressure sensors 104A, 104B, 104C and 104D are of a suitable conventional type and are installed in the respective auxiliary axle control circuits 54A, 54B, 54C and 78 at a location so as to provide a voltage output to the Computer 102 representing the down force actually being applied to the respective auxiliary axles 30A, 30B, 30C and 34 when deployed and thereby the weight of the vehicle they are being forced to carry for the purpose of monitoring as well as feedback for pressure regulation in applying the desired auxiliary axle loading. And with the pressure sensors (PS) being of the type that transit their voltage output to the Computer 102 by wire as shown or by wireless transmission.

The weight sensors 106A, 106B and 106C are also of a suitable conventional type with the weight sensor 106A installed between the center of the front axle 22 and an overhead portion of the truck chassis 18 (not shown) to detect the weight carried by the front axle and provide a voltage output to the Computer 102 representing this weight. See FIGS. 4 and 5. And with the weight sensor 106B installed between a crossbeam 110 rigidly connecting the walking beams 112A and 112B in the tandem axle suspension system 40 and an overhead portion of the truck chassis (not shown) to detect the weight carried by the axles 26A and 26B and provide a voltage output to the Computer 102 representing this weight. See FIG. 4.

Whereas as shown in FIG. 5, the walking beams 112A and 112B are not rigidly connected and in that case, weight sensors 106B and 106C are installed between the respective walking beams 112A, 112B and overhead portions of the truck chassis (not shown) so as to detect the weight carried by the tandem axles and provide voltage outputs to the Computer 102 representing these weights that are then averaged by the computer as programmed in arriving at the weight carried by these axles with this tandem axle suspension arrangement. And like the pressure sensors (PS), the weight sensors (WS) are of the type that transmit their voltage output to the Computer 102 by wire or by wireless transmission for monitoring purposes as well auxiliary axle usage. And with respect to both the weight sensors (WS) and the pressure sensors (PS), it will also be understood that the circuitry of each may include a voltage conditioner that regulates the power to the sensor in a suitable manner and amplifies the voltage output sent from the sensor to the computer as necessary.

Describing now the Axle Load Monitoring System (ALMS) 100, it is important to first recognize when there is an actual need for auxiliary axle usage on the addition of a load to the vehicle and then can auxiliary axle usage that will provide a weight distribution between all the axles then supporting the vehicle in a highly efficient manner with whatever auxiliary axle(s) is available. Such that the weight then carried by the primary axles whenever possible does not exceed their maximum allowable carrying weight and when required to do so is minimized to the extent possible with the maximum allowable axle carrying weight of the auxiliary axles. And when both the primary axles and auxiliary axles also have a minimum allowable carrying weight for reasons of overall performance, the difficulty in providing effective auxiliary axle usage increases significantly and especially where it is desired to optimize the weight carried by the primary axles. And in considering how to efficiently manage auxiliary axle usage, it is important to recognize that the center of gravity of the vehicle plays an important factor in that it can shift longitudinally of the vehicle to a significant extent with the addition of a load from the location that exists with the vehicle unladened. And in the case of the dump truck 10, its center of gravity 114 without a load is located as shown in FIG. 1 and will relocate rearwardly and upwardly as load is added and thereby shift and alter the weight carried by the primary axles accordingly.

In arriving at the present invention, it was found that the ability to provide significantly advantageous auxiliary axle usage is dependent on the vehicle's existing center of gravity residing in a compliance-manageable range A as shown with respect to the dump truck 10 in FIGS. 6-19 and shown in FIGS. 20-32 with respect to other load-transporting vehicles later described. Wherein the compliance-manageable range A is determined by (a) the current gross vehicle weight, (b) the maximum allowable carrying weight of each primary axle that has a prescribed maximum allowable carrying weight, (c) the minimum allowable carrying weight of each primary axle that has a prescribed minimum allowable carrying weight, (d) the maximum allowable axle group carrying weight of each axle group that has a prescribed maximum allowable carrying weight, (e) the minimum allowable axle group carrying weight of each axle group that has a prescribed minimum allowable axle group carrying weight, (f) the maximum allowable carrying weight of each auxiliary axle that has a prescribed maximum allowable carrying weight, (g) the minimum allowable carrying weight of each auxiliary axle that has a prescribed minimum allowable carrying weight, and (h) the distance of each primary axle and each auxiliary axle from a fixed datum point on the vehicle such as on the centerline of the front axle as shown or some other suitable location on the vehicle including the vehicle chassis. And wherein the width of the compliance-manageable range A that results from such determination is defined by the range-bordering distances B and C from the datum point that is on the centerline of the front axle in all the exemplars.

And in considering the application of the manageable range A utilized, it was also recognized (a) that the wider the range of acceptable primary axle carrying weights, the wider the compliance-manageable range A, (b) that the compliance-manageable range A narrows as the gross vehicle weight approaches the maximum allowable, (c) that the larger the number of auxiliary axles available, the wider the compliance-manageable range A, and (d) that the wider the range of allowable auxiliary axle carrying weights, the greater the flexibility in manipulating the weight distribution between all of the supporting axles in the most suitable manner as further described later.

In preparing the Axle Load Monitoring System (ALMS) 100 to perform in the manner afforded by the present invention, the information listed below is provided to the Computer 102. That is then utilized by the tasking/programming of the Computer 102 described later in carrying out the desired axle load monitoring including also providing recommended auxiliary axle usage based on the axle load monitoring results.

Information Provided to the Computer 102
1. The number of primary axles.
2. The distance of each primary axle from a fixed datum point on the vehicle.
3. The maximum allowable carrying weight of each primary axle.
4. The number of auxiliary axles.
5. The distance of each auxiliary axle from the fixed datum point.
6. The maximum allowable carrying weight of each auxiliary axle.
7. Designation of any group of auxiliary axles that are jointly stowed, deployed and loaded.
8. The operating pressure-forced axle loading relationship for each auxiliary axle consisting of at least two distinct fluid pressure values for the axle's operating devices (air springs or hydraulic cylinders) and the corresponding resulting weights on the auxiliary axle for each pressure value. And for auxiliary axles that do not have a linearly proportional relationship between the operating pressure and weight on the axle, it is to be understood that more entries will increase the accuracy provided.
9. The maximum allowable gross vehicle weight if applicable federal or state law is not to be applied.
10. The current vehicle weight on each of the primary axles.
11. The applicable state law or associated table of weight limitations if to be applied.
12. The applicable federal law or associated table of weight limitations if to be applied.
13. The minimum allowable carrying weight of each primary axle if to be applied.
14. The minimum and maximum optimum carrying weight of each primary axle if to be applied.
15. The minimum and maximum allowable carrying weight for any group of consecutive primary axles and/or deployed auxiliary axles if to be applied.
16. The minimum and maximum optimum carrying weight for any group of consecutive primary axles and/or deployed auxiliary axles if to be applied.
17. The minimum allowable carrying weight of each auxiliary axle if to be applied.
18. The minimum gross vehicle weight for auxiliary axle deployment if to be applied.
19. Weight scale devices that are connected to the system to deliver vehicle weight information electronically.
20. The current fluid pressure acting to load each deployed auxiliary axle.
21. The current deployment status of each auxiliary axle.
22. The vehicle operator specified deployment state (stowed or deployed) of any auxiliary axles if to be applied.

23. The vehicle operator specified loading of any auxiliary axles if to be applied.

As to current weight information supplied to the Computer 102, it will be understood that in the absence of onboard weight sensors or some other form of onboard means for detecting the current weight being carried by the primary axles, such weight information can be provided with the use of platform weight scales at a weighing station and portable scales placed under their wheels and transmitted by wire or wireless to the Computer 102, or manually entered by the vehicle operator. Or the current weight information regarding the primary axles can be provided by suitable onboard weight sensors added in adapting the ALMS 100 to a vehicle. As demonstrated with the dump truck 10 in the installation of the weight sensors 106A, 106B and 106C with respect to the primary axles along with that of the pressure sensors 104A, 104B, 104C and 104D with respect to the auxiliary axles in supporting the Axle Load Monitoring System (ALMS) 100 to perform in the manner afforded by the present invention with the tasking/programming of the Computer 102 as described below in recommending auxiliary axle usage (stowing or deploying and/or loading) when there is two or more primary axles and one or more auxiliary axles. And with the understanding that a Group of Consecutive Axles (GCA) is any group of consecutive primary axles and/or deployed auxiliary axles, and in considering every possible combination of the deployed auxiliary axles, a vehicle may have many GCAs. And that the maximum gross vehicle weight is considered the maximum allowable gross vehicle weight of the GCA determined by all the vehicle's axles.

Tasks Performed by the Computer 102

1. If federal or state law is to be applied, ensure that no axle or Group of Consecutive Axles (GCA) has a maximum allowable carrying weight that exceeds the limit set forth by the regulations in the manner that follows:
    a. If federal law is to be applied, determine the maximum allowable weight for any primary axle, auxiliary axle, or GCA on the vehicle based on the distances between all the axles on the vehicle and the Federal Bridge Formula (FBF) or associated table of limitations.
    b. If state law is to be applied, determine the maximum allowable weight for any primary axle, auxiliary axle, or GCA on the vehicle based on the distances between all the axles on the vehicle and the state law or associated table of limitations.
    c. For every primary axle, auxiliary axle, and GCA on the vehicle that has a federally mandated maximum allowable weight or state-mandated maximum allowable weight or a user prescribed maximum allowable weight, set its effective maximum allowable weight (EMAW) to the lowest of:
        i. The federally-mandated maximum allowable weight if it is to be applied.
        ii. The state-mandated maximum allowable weight if it is to be applied.
        iii. A system user prescribed maximum allowable weight.
2. If federal law and state law are not to be applied, for each primary axle, auxiliary axle, and GCA on the vehicle that has a prescribed maximum allowable weight, set its EMAW to its prescribed maximum allowable weight.
3. If the minimum Vehicle Weight for auxiliary axle Deployment (VWD) is not prescribed, set it to zero.
4. Immediately qualify current vehicle weight information that is manually entered in the system.
5. Upon receiving current vehicle weight information that is not manually entered in the system, send a signal indicating that vehicle weight information is being received but is not yet qualified or accepted, and qualify such vehicle weight information only if the vehicle weight information is received at least 5 separate and distinct times in a 5 second interval and the information does not deviate more than 1% over that 5 second interval, and accept the current vehicle weight as the mean of the information received over the time interval when the time interval passes.
6. Accept qualified vehicle weight information only if:
    a. The current fluid pressure acting to load deployed auxiliary axles is provided to the system, or
    b. A signal indicating the current deployment status of each auxiliary axle is provided to the system, and such signals indicate that all auxiliary axles are currently stowed, or
    c. The operator confirms that the qualified weight information received is that with the vehicle having all auxiliary axles stowed.
7. Upon accepting current vehicle weight information, send a signal indicating such and determine the current weight with all auxiliary axles stowed (WAAS) at each of the primary axles, accounting for the weight on any auxiliary axles that are currently deployed if the current fluid pressure acting to load deployed auxiliary axles is provided to the system and such pressure(s) indicate that one or more auxiliary axles are deployed, and determine the location of the center of gravity of the vehicle (COGV) with respect to the fixed datum point according to the vehicle information provided.
8. For any primary axle, auxiliary axle, or GCA that has an EMAW, establish for that axle or GCA an allowable weight-carrying range (AWCR) that spans from the prescribed minimum allowable weight to the associated EMAW for that axle or GCA. For any such axle or GCA lacking a prescribed minimum allowable weight, use a weight of zero for the minimum in establishing the AWCR.
9. For any primary axle, auxiliary axle, or GCA that has a prescribed maximum optimum weight, establish for that axle or GCA an optimum weight-carrying range (OWCR) that spans from the prescribed minimum optimum weight to the associated prescribed maximum optimum weight for that axle or GCA. For any such axle or GCA lacking a prescribed minimum optimum weight, the minimum weight used to establish its OWCR is its prescribed minimum allowable weight if a minimum allowable weight has been prescribed or zero if a minimum allowable weight has not been prescribed.
10. When the current fluid pressure acting to load deployed auxiliary axles is provided to the system and such pressure(s) indicate that one or more auxiliary axles are currently deployed:
    a. Determine the current loading on each deployed auxiliary axle using the provided operating pressure-forced axle loading relationship for that axle.
    b. If the WAAS at each primary axle has been determined:
        i. Calculate the resulting weight carried by the primary axles and all GCAs based on the currently deployed auxiliary axles and the current loading at each.

ii. Determine if any primary axle, auxiliary axle, or GCA is subsequently loaded outside its AWCR, and if so send a signal indicating such.
11. Account for vehicle operator specification of any auxiliary axle's deployment state or loading wherein any axle having its deployment state (stowed or deployed) specified by the vehicle operator is established in an operator-specified deployment mode and any axle having its loading specified by the vehicle operator is established in an operator-specified loading mode, and subsequently the system will compensate for that axle being stowed, deployed, or loaded as specified by the vehicle operator when advising the deployment, stowing, and loading of any remaining axles that are not in an operator-specified deployment mode or operator-specified loading mode.
12. Account for any auxiliary axle established in an operator-specified deployment mode and no longer having a vehicle operator specified deployment state, wherein the axle is disestablished from an operator-specified deployment mode and returned to normal system deployment advising functionality, and any auxiliary axle that is established in an operator-specified loading mode and no longer having a vehicle operator specified loading, wherein the axle is disestablished from an operator-specified loading mode and returned to normal system loading advising functionality.
13. Account for any group of auxiliary axles that are designated as being jointly stowed, deployed and loaded wherein all axles in the group must be deployed or all axles in the group must be stowed and when the axles in the group are deployed they must all be loaded substantially equally as follows:
    a. If any axle in the group is established in an operator-specified deployment mode then all other axles in the group are also established in that same operator-specified deployment mode.
    b. If no axles in the group are established in an operator-specified deployment mode then possible combinations of auxiliary axle deployment to be considered by the system must include all the axles in the group being deployed or all the axles in the group being stowed.
    c. If any axle in the group is established in an operator-specified loading mode then all other axles in the group are also established in an operator-specified loading mode at the same load amount.
    d. If no axles in the group are established in an operator-specified loading mode then possible combinations of auxiliary axle loading to be considered by the system must include all the axles in the group being loaded equally.
14. On detecting that the current vehicle weight exceeds the VWD, determine auxiliary axle necessity when the WAAS at any primary axle is outside its AWCR and when the WAAS at any group of consecutive primary axles has an AWCR that is outside its AWCR.
15. On detecting that the current vehicle weight does not exceed the VWD, or that there is no auxiliary axle necessity, send a signal indicating that no auxiliary axle deployment is deemed necessary, and:
    a. Designate all auxiliary axles for stowing that are not in an operator-specified deployment mode.
    b. For any auxiliary axle established in an operator-specified deployment mode, designate it for deployment or stowing as specified by the operator.
    c. For any operator-specified auxiliary axle to be deployed but not in an operator-specified loading mode, designate that axle for loading at its prescribed minimum allowable carrying weight.
    d. For any operator-specified auxiliary axle to be deployed and in an operator-specified loading mode, designate that axle for loading as specified by the operator.
    e. If any auxiliary axles remain designated for deployment, determine the resulting weight carried by the primary axles based on those auxiliary axles being deployed and loaded as designated.
16. On detecting auxiliary axle necessity, determine the center of gravity manageable range (COGMR) that is the range of distance from the fixed datum point within which the COGV can be located such that auxiliary axle usage will result in all axles and GCAs having AWCRs being loaded within their AWCRs. Wherein the COGMR is calculated based on the current vehicle weight, the distances between all the axles on the vehicle, and the AWCRs of all axles and GCAs that have AWCRs.
17. On detecting auxiliary axle necessity and that the current COGV is located within the COGMR, considering every possible combination of auxiliary axle deployment, determine qualifying acceptable combination(s) (QAC) of auxiliary axles for deployment such that when the combination is deployed and loaded:
    a. Each deployed auxiliary axle is loaded within its AWCR
    b. The resulting weight carried by each primary axle is within its AWCR.
    c. The resulting weight carried by any subsequent GCA that has an AWCR is within its AWCR.
18. When multiple QACs exist, determine the QACs that would deploy the fewest auxiliary axles and disqualify all others.
19. When one or more QACs exist, and any primary axle or GCA has an OWCR:
    a. For each QAC determine its optimal loading of the auxiliary axles to be deployed in the QAC such that:
        i. Each deployed auxiliary axle is loaded within its AWCR.
        ii. The vehicle degree of optimal loading (VDOL) is maximized, wherein:
            1. For any primary axle or GCA having an OWCR, its degree of optimal loading (DOL) is calculated as follows when the resulting weight on the axle or GCA is outside its OWCR:

$$DOL = \frac{-|W_{RA} - W_{NEO}|}{W_{NEO}}$$

Where:
            $W_{RA}$=the resulting weight on the primary axle or GCA.
            $W_{NEO}$=the extreme end (minimum or maximum) weight value of the OWCR for the axle or GCA that is nearest the $W_{RA}$.
            2. For any primary axle or GCA having an OWCR, its degree of optimal loading (DOL) is calculated as follows when the resulting weight on the axle or GCA is within its OWCR:

$$DOL = \frac{|W_{RA} - W_{NEO}|}{W_{NEO}}$$

Where again:

$W_{RA}$=the resulting weight on the primary axle or GCA.

$W_{NEO}$=the extreme end (minimum or maximum) weight value of the OWCR for the axle or GCA that is nearest the $W_{RA}$.

3. The VDOL=the minimum DOL of all primary axles and GCAs having a DOL.

b. If multiple QACs exist, filter the QACs in this order until one QAC remains:
  i. With each QAC having its optimal loading as determined above, find the QAC that has the maximum VDOL of all the QACs and disqualify all QACs in which the VDOL is less than this maximum.
  ii. Determine from the remaining QACs those that result in the highest DOL at the forward most primary axle and disqualify all others
  iii. Determine from the remaining QACs those that do not deploy the rear-most auxiliary axle and disqualify all others.
  iv. Arbitrarily select one from the QACs that remain.

20. When one or more QACs exist, and no primary axle or GCA has an OWCR:
  a. For each QAC determine its most acceptable loading of the auxiliary axles to be deployed in the QAC such that:
    i. Each deployed auxiliary axle is loaded within its AWCR.
    ii. The vehicle degree of acceptable loading (VDAL) is maximized, where:
      1. For any primary axle or subsequent GCAs having an AWCR, its degree of acceptable loading (DAL) is determined as follows:

$$DAL = \frac{|W_{RA} - W_{NEA}|}{W_{NEA}}$$

Where:
$W_{RA}$=the resulting weight on the primary axle or GCA.
$W_{NEA}$=the extreme end (minimum or maximum) weight value of the AWCR for the axle or GCA that is nearest the $W_{RA}$.
      2. VDAL=the minimum DAL of all primary axles and GCAs having a DAL.
  b. If multiple QACs exist, filter the remaining QACs in this order until one QAC remains:
    i. With each QAC having its most acceptable loading as determined above, find the QAC that has the maximum VDAL of all QACs and disqualify all QACs in which the VDAL is less than this maximum.
    ii. Determine from the remaining QACs those that result in the highest DAL at the forward-most primary axle and disqualify all others.
    iii. Determine from the remaining QACs those that do not deploy the rear-most auxiliary axle and disqualify all others.
    iv. Arbitrarily select one from the QACs that remain.

21. When one QAC exists, and no auxiliary axles have been established in an operator-specified deployment mode and no auxiliary axles have been established in an operator-specified loading mode, designate the auxiliary axles for deployment, stowing, and loading according to the QAC and the optimal loading or most acceptable loading as determined in steps 19 and 20.

22. When auxiliary axle necessity has been detected and the current COGV is located outside the COGMR or the current vehicle weight exceeds the prescribed maximum allowable gross vehicle weight (no QAC exists):
  a. Considering every possible combination of auxiliary axle deployment, with each being an unacceptable deployment combination (UDC), determine the least unacceptable loading for each such that when the combination is deployed and loaded:
    i. Each deployed auxiliary axle is loaded within its AWCR.
    ii. The vehicle degree of unacceptable loading (VDUL) is minimized, where:
      1. For any primary axle or GCA having an AWCR at which the resulting weight is outside its AWCR determine its degree of unacceptable loading (DUL) as follows:

$$DUL = \frac{|W_{RA} - W_{NEA}|}{W_{NEA}}$$

Where:
$W_{RA}$=the resulting weight on the axle or GCA.
$W_{NEA}$=the extreme end (minimum or maximum) weight value of the AWCR for the axle or GCA that is nearest the $W_{RA}$.
      2. Determine the vehicle degree of unacceptable loading (VDUL) as follows:

$$VDUL = D_{UMax} + \left(\frac{[0.05(N-1)]}{N}\right)$$

Where:
$D_{UMax}$=the maximum DUL value of all primary axles and GCAs that have DULs.
N=the number of primary axles and GCAs having DULs.
  b. When multiple UDCs exist, filter the UDCs in the following order until one UDC remains:
    i. With each UDC having its least unacceptable loading as determined above, find the UDCs that result in the lowest VDUL and disqualify all others.
    ii. Determine from the remaining UDCs the minimum DUL for any primary axles or GCAs that have DULs, and disqualify all UDCs in which the lowest of the DULs resulting from the UDC is greater than this minimum.
    iii. Determine from the remaining UDCs the UDC that results in the least number of auxiliary axles being deployed, and disqualify all others.
    iv. Determine from the remaining UDCs the UDC that results in the minimum DUL at the forward-most primary axle, and disqualify all UDCs that result in the forward-most primary axle having a higher DUL than this minimum.
    v. Arbitrarily select one from the UDCs that remain.

c. Determine the vehicle loading cause of unacceptability VLCU:
   i. If the current vehicle weight exceeds the prescribed maximum allowable gross vehicle weight, the vehicle is overloaded.
   ii. If the COGV is located outside the COGMR and is located forward of the COGMR, the vehicle loaded too far forward.
   iii. If the COGV is located outside the COGMR and is located rearward of the COGMR, the vehicle loaded too far rearward.
   iv. Identify that the VLCU indicates that the vehicle is overloaded and/or the vehicle is loaded too far rearward or too far forward.
23. When one UDC exists, and no auxiliary axles have been established in an operator-specified deployment mode and no auxiliary axles have been established in an operator-specified loading mode, designate the auxiliary axles for stowing, deployment, and loading according to the UDC and its least unacceptable loading as determined in step 22.
24. When auxiliary axle necessity has been detected and one or more auxiliary axles have been established in an operator-specified deployment mode or one or more auxiliary axles have been established in an operator-specified loading mode:
   a. Determine alternate qualifying acceptable combination(s) (AQAC), that are determined in the same manner as the QACs in step 17, except with these additional requirements:
      i. Any auxiliary axle that has been operator-specified deployed must remain deployed.
      ii. Any auxiliary axle that has been operator-specified stowed must remain stowed.
      iii. Any auxiliary axle established in an operator-specified loading mode, if to be deployed, must be loaded as specified by the operator.
   b. When multiple AQACs exist, determine the AQACs that would deploy the fewest auxiliary axles and disqualify all others.
   c. When one or more AQACs exist, and any primary axle or GCA has an OWCR, for each AQAC determine its optimum loading and filter to one combination as was performed for the QACs in step 19, except with these additional requirements:
      i. Any auxiliary axle that has been operator-specified deployed must remain deployed.
      ii. Any auxiliary axle that has been operator-specified stowed must remain stowed.
      iii. Any auxiliary axle established in an operator-specified loading mode, if to be deployed, must be loaded as specified by the operator.
   d. When one or more AQACs exist, and no primary axle or GCA has an OWCR, for each AQAC determine its most acceptable loading and filter to one combination as was performed for the QACs in step 20, except with these additional requirements:
      i. Any auxiliary axle that has been operator-specified deployed must remain deployed.
      ii. Any auxiliary axle that has been operator-specified stowed must remain stowed.
      iii. Any auxiliary axle established in an operator-specified loading mode, if to be deployed, must be loaded as specified by the operator.
   e. When one AQAC exists, designate the auxiliary axles for deployment, stowing, and loading according to the QAC and its optimal loading or most acceptable loading as determined in steps 24c and 24d.
   f. When no AQAC exists, determine alternate unacceptable deployment combination(s) (AUDCs) and their least unacceptable loading and filter to one combination in the same manner as the UDCs in step 22, except with these additional requirements:
      i. Any auxiliary axle that has been operator-specified deployed must remain deployed.
      ii. Any auxiliary axle that has been operator-specified stowed must remain stowed.
      iii. Any auxiliary axle established in an operator-specified loading mode, if to be deployed, must be loaded as specified by the operator.
   g. When one AUDC exists, designate the auxiliary axles for deployment, stowing, and loading according to the UDC and its least unacceptable loading as determined in step 24f.
25. For each auxiliary axle that is designated for deployment and loading, determine the target air pressure or hydraulic pressure of the axle's operating device(s) corresponding to the designated loading based on the operating pressure/forced axle loading relationship provided for that auxiliary axle:
   a. If the designated loading of the auxiliary axle equals one of the weight values in the operating pressure/forced loading relationship provided, set the target pressure for that auxiliary axle at the operating pressure corresponding to that weight value.
   b. If the designated loading of the auxiliary axle is between two prescribed weight values in the pressure/weight relationship table, scale the pressure linearly between the two corresponding pressures to determine the target pressure.
   c. If the designated loading of the auxiliary axle is not between two prescribed weight values in the pressure/weight relationship table, scale the pressure linearly between the two prescribed weight values that are nearest the designated loading to determine the target pressure.
26. For every auxiliary axle on the vehicle, indicate to the vehicle operator:
   a. Whether the axle is in operator-specified deployment mode.
   b. Whether the axle is in operator-specified loading mode.
   c. The current deployment state of the axle, if notice indicating such is provided to the system or if the fluid pressure acting to load the axle is provided to the system.
   d. The current fluid pressure acting to load the axle, if it is provided to the system.
   e. The designated deployment state of the axle as determined by the system.
   f. The target fluid (air or hydraulic) pressure to load the axle as determined by the system, if it is designated for loading.
27. If notice indicating the current deployment state of each auxiliary axle is provided to the system, or if the current fluid pressure acting to load deployed auxiliary axles is provided to the system:
   a. If the current deployment state of any auxiliary axle does not match the designated deployment state of the axle as determined by the system, send a signal indicating that a deployment change is deemed necessary.

b. If the current deployment state of each auxiliary axle matches its designated deployment state as determined by the system, send a signal indicating that no deployment change is deemed necessary.
28. If the current fluid pressure acting to load deployed auxiliary axles is provided to the system:
   a. If the current fluid pressure acting to load any auxiliary axle does not match the target pressure according to its designated loading as determined by the system, send a signal indicating that a loading change is deemed necessary.
   b. If the current fluid pressure acting to load each deployed auxiliary axle matches its target pressures according to its designated loading as determined by the system, send a signal indicating that no loading change is deemed necessary.
29. Output the resulting weight distribution information based on the auxiliary axles being deployed or stowed as designated and loaded as designated:
   a. Indicate which primary axles and GCAs, if any, are then loaded within their AWCR.
   b. Indicate which primary axles and GCAs, if any, are then loaded within their OWCR.
   c. Indicate which primary axles and GCAs, if any, are then loaded outside their AWCR.
   d. If a UDC exists, indicate the VLCU.
   e. If an AQAC exists and any primary axles or GCAs have OCWRs, and the VDOL of the AQAC is less than the VDOL of the QAC, indicate that auxiliary axle(s) being established in an operator-specified deployment mode or operator-specified loading mode cause less optimal weight redistribution than would be achievable otherwise.
   f. If an AUDC exists and a QAC exists, indicate that auxiliary axle(s) being established in an operator-specified deployment mode or operator-specified loading mode cause unacceptable weight redistribution when otherwise acceptable weight redistribution would be achievable.
   g. If an AUDC exists and a UDC exists, and the VDUL of the AUDC is greater than the VDUL of the UDC, indicate that auxiliary axle(s) being established in an operator-specified deployment mode or operator-specified loading mode cause unacceptable loading to a greater degree than would be achievable otherwise.

From the above tasking/programming, it will be observed that the Axle Load Monitoring System (ALMS) 100 is adapted to detect a noncompliant axle carrying-weight condition when the weight of the vehicle acting on any one of the primary axles exceeds a prescribed maximum allowable axle carrying weight assigned to that axle and also when the weight acting on a group of the axles arranged consecutively and then supporting the vehicle exceeds a prescribed maximum allowable axle carrying weight assigned to that group. With the ALMS on detecting the noncompliant axle carrying-weight condition being further adapted to recommend auxiliary axle usage that would result in compliant carrying-weight conditions provided the current vehicle weight does not exceed a prescribed maximum allowable gross vehicle weight determined by all the axles and the current center of gravity of the vehicle is located within the compliance-manageable range as defined. Furthermore, the programming also provides for the ALMS recommending auxiliary axle usage that results in the weight on any primary axle and axle group not being less than a prescribed minimum allowable axle carrying weight that has been assigned and the weight on any primary axle and axle group being within a prescribed optimum weight-carrying range that has been assigned.

Moreover, it will be observed that the ALMS is also adapted to detect a noncompliant axle carrying-weight condition when the current gross vehicle weight either exceeds a prescribed maximum allowed gross vehicle weight and the current center of gravity of the vehicle is located within the applicable compliance-manageable range and also when the current gross vehicle weight either exceeds or is less than the prescribed maximum allowed gross vehicle weight and the current center of gravity is located outside the compliance-manageable range. And the ALMS on detecting any such noncompliant axle carrying-weight condition is adapted to recommend auxiliary axle usage such that any resulting noncompliant weight is minimized to a prescribed degree.

With the Computer 102 tasked/programmed as set forth, the ALMS 100 is also adapted to allow for the vehicle operator to manually specify the stowing or deploying and/or loading of any auxiliary axle and then effect auxiliary axle usage accordingly. For example, the ALMS 100 is adapted to recommend auxiliary axle usage utilizing the stowing or deploying of any auxiliary axle specified by an operator of the vehicle. Furthermore, the ALMS 100 is also adapted to recommend auxiliary axle usage utilizing the loading of any auxiliary axle specified by an operator of the vehicle provided the specified loading that is not less than this auxiliary axle's prescribed minimum allowable carrying weight and not greater than this auxiliary axle's prescribed maximum allowable carrying weight. Furthermore, the ALMS 100 is also adapted to recommend auxiliary axle usage utilizing the stowing or deploying of any auxiliary axle specified by an operator of the vehicle and the loading of any auxiliary axle when deployed specified by an operator of the vehicle n operator of the vehicle to specify the stowing or deploying of any auxiliary axle and the loading of any auxiliary axle when deployed spec provided the specified loading thereof is not less than this auxiliary axle's prescribed minimum allowable carrying weight and not greater than this auxiliary axle's prescribed maximum allowable carrying weight.

Moreover, the vehicle operator can specify the stowing or deploying and/or loading of any auxiliary axle at any time. For example, in the daily operations of the vehicle, conditions can arise where the vehicle operator may want to specify the stowing or deploying and/or loading condition of one or more of the auxiliary axles to alleviate an existing problem. Such as when the vehicle operator notices that an auxiliary axle and/or one or both of its tires is damaged and may then want to keep that axle stowed until repairs are made or the axle is replaced in which case the vehicle operator can specify it to be stowed or limit the load that will be placed on the axle when it is used and in that case also specify the loading thereof as being a prescribed minimum allowable loading. With the ALMS 100 accounting for such specified auxiliary use and recommending optimal use of any remaining auxiliary axles accordingly. And if the optimal usage of the remaining auxiliary axles that is recommended would result in noncompliance, the ALMS 100 notifies the vehicle operator of this situation.

Furthermore, the vehicle operator can specify auxiliary axle usage changes while in the process of operating the vehicle as there is no need to specify any stowing or deploying and/or loading beforehand. For example, the ALMS 100 may recommend deploying all the auxiliary axles and recommend loading them as tasked and this will be a combination of stowing or deploying and/or loading that results in the most optimal redistribution of weight between the supporting axles, but not necessarily the only combination. For example, the system may recommend that one pusher axle be loaded with 5,000 pounds and another pusher axle be loaded with 8,000 pounds that is the maximum allowable. The vehicle operator could then specify the loading on the one pusher axle at 6,000 pounds instead of the advised loading of 5,000 pounds and the ALMS 100 will adjust its recommended loading on the other pusher axle from 8,000 pounds to 7,000 pounds that is below the maximum allowed. And this may result in weight redistribution that is just as "optimal" as before. Or if the change effected by the vehicle operator causes less optimal loading, the ALMS 100 will notify the vehicle operator of such. And the vehicle operator can then choose to leave the specified loading on the one pusher axle and proceed with the operation of the vehicle. And if the vehicle operator finds the resulting redistribution unacceptable, the vehicle operator can then relinquish the specified loading and revert to the system recommended loading.

And in the case of the dump truck 10, the recommended auxiliary axle usage provided in an advisory manner by the ALMS 100 with the Computer 102 can be implemented by the vehicle operator via the Central Command Module (CCM) 98 and Master Control Valve Center (MCVC) 96. Wherein the Computer 102 in summary provides the following listed useful information for the vehicle operator via the Informational Module (IM) 108.

Information Provided by the Computer 102
1. Indication that current vehicle weight information is being received, but is not yet accepted.
2. Indication that current vehicle weight information has been accepted.
3. The current total vehicle weight based on the most recent weight information received and accepted.
4. The current deployment state of every auxiliary axle, if such information is provided to the system.
5. The current fluid pressure and resulting carrying weight corresponding to that fluid pressure of any auxiliary axle that is currently deployed, if the current fluid pressure of each auxiliary axle is provided to the system
6. The current weight carried at each of the primary axles, if the current fluid pressure of each auxiliary axle is provided to the system, or if the current deployment state of each auxiliary axle is provided to the system and all auxiliary axles are currently stowed.
7. Indication that a primary axle, auxiliary axle, or GCA is currently loaded outside its AWCR, based on the current loading of each auxiliary axle, if the current fluid pressure of each auxiliary axle is provided to the system.
8. The advised deployment state (stowed or deployed) of every auxiliary axle, as determined by the system
9. The advised fluid pressure acting to load any auxiliary axle that is advised to be deployed, and its resulting carrying weight corresponding to its advised fluid pressure, as determined by the system
10. The resulting weight to be carried at each primary axle, based on the auxiliary axles being deployed and loaded as advised by the system.
11. Indication of whether the resulting weight to be carried by an axle or GCA is within its OWCR, or else is within its AWCR, or else is outside its AWCR, based on the auxiliary axles being deployed and loaded as advised by the system.
12. VCULs, or the reason(s) why the resulting weight to be carried by any axle or GCA is outside its AWCR (vehicle overloaded or loaded too far rearward or forward), based on the auxiliary axles being deployed and loaded as advised by the system.
13. Indication that an auxiliary axle is currently in an operator-specified deployment mode or operator-specified loading mode.
14. Notification that no auxiliary axle deployment is deemed necessary now.
15. Notification that auxiliary axle deployment or loading change has been determined necessary.
16. Notification that all auxiliary axles are currently stowed or deployed and loaded as advised by the system, and no change is necessary now.
17. Notification that one or more auxiliary axles being in an operator-specified deployment mode and/or operator-specified loading mode causes unacceptable loading when acceptable loading would be achievable otherwise, based on the auxiliary axles being deployed and loaded as advised by the system.
18. Notification that one or more auxiliary axles being in an operator-specified deployment mode and/or operator-specified loading mode causes less optimal loading than would be achievable otherwise, based on the auxiliary axles being deployed and loaded as recommended by the system.
19. Notification that one or more auxiliary axles being in an operator-specified deployment mode and/or operator-specified loading mode causes a greater degree of unacceptable loading than would be achievable otherwise, based on the auxiliary axles being deployed and loaded as recommended by the system.

Using the dump truck 10 as exemplary of the application of the Axle Load Monitoring System (ALMS) 100 to load-transporting motor vehicles in general having one or more auxiliary axles and with reference to FIGS. 1-19, there will now be described the auxiliary axle usage that is recommended by the ALMS on the addition of load and the results obtained when utilized by a vehicle operator. Wherein the relevant information provided to the Computer 102 for the dump truck 10 is listed below.

Information Provided for the Dump Truck 10
1. The maximum allowable carrying weight on the front axle 22 is 20,000 pounds.
2. The minimum allowable carrying weight on the front axle 22 is 14,000 pounds.
3. The maximum optimum weight on the front axle 22 is 18,000 pounds.
4. The minimum optimum weight on the front axle 22 is 16,000 pounds.
5. The maximum allowable weight on the tandem axles 26A and 26B as a group is 34,000 pounds.
6. The minimum allowable weight on the tandem axles 26A and 26B as a group is 26,000 pounds.
7. The optimum maximum weight on the tandem axles 26A and 26B as a group is 32,000 pounds.
8. The optimum minimum weight on the tandem axles 26A and 26B as a group is 28,000 pounds.
9. The maximum allowable weight on the pusher axles 30A, 30B and 30C is 8,000 pounds.
10. The minimum allowable weight on the pusher axles 30A, 30B and 30C is 1,500 pounds.
11. The maximum allowable weight on the trailing axle 34 is 13,000 pounds.
12. The minimum allowable weight on the trailing axle 34 is 2,500 pounds.

13. The minimum gross vehicle weight for auxiliary axle deployment is 50,000 pounds.

14. The applicable federal law is to be applied.

Describing now examples of the operation of the Axle Load Monitoring System (ALMS) 100 with respect to auxiliary axle deployment and loading in regard to dump truck 10 and starting with FIG. 1 and with the ALMS 100 activated by the vehicle operator at the Central Command Module (CCM) 98 and there being no load on the truck and no auxiliary axles deployed, the weight sensors (either 106A and 106B or 106A, 106B and 106C) inform the Computer 102 that the weight on the front axle is 12,000 pounds and the weight on the tandem axles 26A and 26B is 16,000 pounds and thus indicates that the tare weight (unladened weight) of the truck 10 is 28,000 pounds. And the Computer 102 from the axle locations provided and employing the information provided by the weight sensors (WS) determines that the existing center of gravity 114 of the truck 10 is located as shown in FIG. 1 and detects whether there is a need for auxiliary axle use employing the detecting technique provided and the maximum allowable weight on the axles and the maximum allowable gross vehicle weight prescribed by the Federal Bridge Formula (FBF). That limits the maximum allowable weight on the front axle 22 to 20,000 pounds, limits the maximum allowable weight on the tandem axles 26A and 26B as a group to 34,000 pounds because of their spacing, and limits the maximum allowable gross weight of the truck to 54,000 pounds with these supporting axles. And in this case, the ALMS 100 finds that the minimum gross vehicle weight of 50,000 pounds for auxiliary axle deployment is not exceeded and that there is no need for auxiliary axle usage.

Referring next to FIG. 6, a load of 30,000 pounds is now added to the dump truck 10 with the truck stationary resulting in the gross vehicle weight now being 58,000 pounds and with the truck's center of gravity 114 then relocated rearwardly and upwardly from the location shown in FIG. 1 in the then existing compliance-manageable range A shown in FIG. 6. And with the weight sensors (WS) at the primary axles then informing the Computer 102 that the weight on the front axle 22 is now 16,920 pounds and thus less than the FBF imposed limit of 20,000 pounds, the weight on the tandem axles 26A and 26B is now 41,080 pounds and thus exceeds the FBF imposed limit of 34,000 pounds, and that that the gross vehicle weight of 58,000 exceeds the FBF imposed limit of 54,000 with these supporting axles. And the Computer 102 detects whether there is then a need for auxiliary axle usage employing the detecting technique provided. And in this instance, the Computer 102 detects there is such need based on the information received from the weight sensors (WS) indicating a noncompliant condition and determines that the deployment and certain loading of the forward-most pusher axle 30A and the trailing axle 34 when implemented would accomplish the desired objectives including using the least number of auxiliary axles that are available in accomplishing such. With the Computer 102 having determined that the pusher axle 30A and trailing axle 34 on deployment would then provide for a maximum allowable gross vehicle weight of 70,500 pounds pursuant to the FBF with these supporting axles. And wherein the Computer 102 has also determined that the weight to then be carried by the pusher axle 30A on deployment is 4,750 pounds and the weight to then be carried by the trailing axle on deployment is 6,250 pounds that are substantially within their respective allowable weight-carrying range.

Turning next to FIG. 7 and with the Computer 102 having determined a suitable response as described above to the existing loaded condition of the truck 10, the Computer 102 so informs the vehicle operator via the Informational Module (IM) 108. Who through command over the Master Control Valve Center (MCVC) 96 via the Command Module (CM) 98 can implement the recommended deployment of the pusher axle 30A and trailing axle 34 as shown in exercising control over their respective control circuits 54A and 78 in deploying the auxiliary axles 30A and 34 including controlling the pressure regulator valves 58A and 86 associated with these axles to establish their loading at 4,750 pounds and 6,250 pounds respectively that are less than their respective maximum allowed carrying weight of 8,000 pounds and 13,000 pounds. And with such auxiliary axle loading operations resulting in the front axle 22 then carrying 17,000 pounds and the tandem axles 26A and 26B then carrying 30,000 pounds with the weight apportioning provided by the auxiliary axles 30A and 34 and thus being advantageously loaded in their respective optimum weight-carrying range and at less than their respective maximum allowable carrying weight of 20,000 pounds and 34,000 pounds imposed by the FBF. And wherein the maximum allowable gross vehicle weight imposed by the FBF has then increased from 54,000 pounds to 70,500 pounds with the axles then supporting vehicle that now includes auxiliary axles 30A and 34 and results in the existing vehicle weight of 58,000 pounds not exceeding that imposed by the FBF.

Referring next to FIG. 8 and with the condition of the pusher axle 30A and trailing axle 34 established as described above, an additional load of 10,000 pounds is now added with the truck stationary resulting in the load then being increased from 30,000 pounds to 40,000 pounds, the gross vehicle weight thus being increased from 58,000 pounds to 68,000 pounds, and the existing vehicle center of gravity 114 now relocated upward accordingly in the then existing compliance-manageable center range A that has narrowed with the increase in the increase in the gross vehicle weight (GVW). And the weight sensors (WS) at the primary axles then inform the Computer 102 that the weight carried by the front axle 22 is now 18,560 pounds and still less than its maximum allowable carrying weight but the weight on the tandem axles 26A and 26B is now 38,140 pounds and thus exceeds their maximum allowable carrying weight of 34,000 pounds imposed by the FBF.

The Computer 102 then processes the current weigh information received on the primary axles 22, 26A and 26B and determines that the currently deployed auxiliary axles 30A and 34 would still provide for the carrying weight of the primary axles being within their optimum weight-carrying range with a minimum number of auxiliary axles by increasing the weight on the deployed pusher axle 30A from 4,750 pounds to 8,000 pounds that is the maximum allowable for this axle and increasing the weight on the deployed trailing axle 34 from 6,250 pounds to 10,350 pounds that is less than its maximum allowed carrying weight of 13,000 pounds. With such adjusting operations resulting in the front axle 22 then carrying 17,830 pounds that is within its optimum weight-carrying range and the tandem axles 26A and 26B then carrying 31,820 pounds that is within their optimum weight-carrying range, and with the existing gross vehicle weight of 68,000 pounds being less than the maximum of 70,500 pounds allowed by the FBF with the existing supporting axles. And the Computer 102 provides this determination of suitable auxiliary axle usage to the vehicle operator via the Information Module (IM) 108 who can then carry out these auxiliary axle loading adjustments as shown in FIG. 9 with the pressure regulator valves 58A and 86 via the Central Command Module (CCM) 98 and Master Control Valve Center (MCVC) 96 wherein the weights carried by the supporting axles are then set as described above with the pusher axle 30A and trailing axle 34 remaining deployed.

Turning now to FIG. 10 and with the auxiliary axle 30A and trailing axle 34 conditioned as described immediately above, an additional load of 7,000 pounds is then added with the truck stationary resulting in the load now being 47,000 pounds and the gross vehicle weight being 75,000 pounds that is greater than the maximum allowed weight of 70,500 pounds imposed by the FBF with the then supporting axles. And wherein the truck's center of gravity has relocated upwardly accordingly within the existing compliance-manageable range A existing with the pusher axle 30A and trailing axle 34 deployed. And the weight sensors (WS) at the primary axles inform the Computer 102 that the weight carried by the front axle 22 is now 18,520 pounds and thus outside its optimum weight-carrying range but still allowable but the weight carried by the tandem axles 26A and 26B is now 38,130 pounds and exceeds the limit of 34,000 pounds imposed by the FBF.

The Computer 102 detects these noncompliant axle weight-carrying conditions and then processes the weight information received on the primary axles and determines that a suitable combination of supporting axles would be obtained by deploying pusher axle 30C, maintaining the weight on the deployed pusher axle 30A at the maximum allowable 8,000 pounds for this axle, establishing the weight carried by the added pusher axle 30C at the maximum allowable 8,000 pounds for this axle, and increasing the weight carried by the deployed trailing axle 34 from 10,350 pounds to 12,000 pounds that is less its allowable 13,000 pounds. That would result in the front axle 22 carrying 17,800 pounds that is within its optimum weight-carrying range, the tandem axles 26A and 26B carrying 29,820 pounds that is within their optimum weight-carrying range, and the existing gross vehicle weight of 75,000 pounds being less than the maximum allowable weight of 75,500 pounds imposed by the FBF with the axles then supporting the vehicle. And the Computer 102 provides this determination of suitable auxiliary axle usage to the vehicle operator via the Information Module (IM) 108 who can then carry out such via the Central Command Module (CCM) 98 and Master Control Valve Center (MCVC) 96 with the pusher axles 30A and 30C and the trailing axle 34 deployed as shown in FIG. 11 and loaded as set forth above.

Referring next to FIG. 12 and with the auxiliary axles 30A, 30C and 34 deployed and conditioned as described above, an additional load of 5,000 pounds is added with the truck stationary resulting in the load now being 52,000 pounds and the gross vehicle weight now being 80,000 pounds that exceeds the maximum allowable weight of 75,500 imposed by the FBF with the existing supporting axles. And with the truck's center of gravity 114 having relocated upward accordingly in the compliance-manageable range A. The weight sensors (WS) at the primary axles inform the Computer 102 that the weight carried by the front axle 22 is now 17,800 pounds and thus within its optimum weight-carrying range but the weight carried by the tandem axles 26A and 26 B is now 34,200 pounds and thus exceeds the limit of 34,000 pounds imposed by the FBF.

The Computer 102 processes the information received on the primary axles, detects the noncompliant axle carrying-weight conditions and determines that suitable auxiliary usage would be obtained in meeting the desired objectives by deploying the pusher axle 30B, reducing the weight on the deployed pusher axle 30A from the maximum allowable 8,000 pounds to 4,230 pounds that is greater than the minimum allowed, maintaining the weight on the deployed pusher axle 30C at 8,000 pounds that is the maximum allowable for this axle, increasing the weight on the deployed trailing axle from 12,000 pounds to 12,770, and establishing the weight carried by the added pusher axle 30B at 8,000 pounds that is the maximum allowed for this axle. That would result in the front axle carrying 17,000 pounds that is within this axle's optimum weight-carrying range, the tandem axles 26A and 26B carrying 30,000 pounds that is within their optimum weight-carrying range, and the maximum allowable gross vehicle weight imposed by the FBF having increased from 75,500 pounds to 80,000 because of the added supporting axle 30B. And the Computer 102 provides this determination of suitable auxiliary axle usage to the vehicle operator via the Information Module (IM) 108 who can then carry out such via the Central Command Module (CCM) 98 and Master Control Valve Center (MCVC) 96 with the truck having a current gross vehicle weight of 80,000 pounds and weights carried by all of the vehicle supporting axles then set as described above with the pusher axles 30A, 30B, 30C and the trailing axle 34 deployed as shown in FIG. 13.

Turning now to FIG. 14, an additional load of 5,000 pounds is then added with the truck stationary resulting in the gross vehicle weight now being 85,000 pounds that exceeds the limit imposed by the FBF, and the truck's center of gravity 114 now relocated further upward accordingly in the compliance-manageable range A. And the weight sensors (WS) at the primary axles inform the Computer 102 that the weight carried by the front axle 22 is now 17,580 pounds and still in its optimum weight-carrying range but the weight carried by the tandem axles 26A and 26B is now 34,420 pounds and thus exceeds the limit of 34,000 pounds imposed by the FBF as well as the current gross vehicle weight of 85,000 exceeding the 80,000 pounds limit imposed by the FBF.

The Computer 102 on detecting such then processes the Information received in determining the most suitable auxiliary axle use. Wherein the programming of the computer as set forth favors the forward-most primary axle that typically has steerable wheels providing for vehicle steerage over utilizing one of the other possible combinations of the available auxiliary axles with the primary axles. With such preference for this primary axle occurring but only when multiple combinations exist that result in the same VDAL, VDOL, or VDUL. In this case, the system recognizes that unacceptable loading is unavoidable due to overloading, but it can make all axles and GCAs acceptable except for the group of all axles. Then the forward-most primary axle is preferred in the formula for VDUL because its weight is lower. And if two combinations resulted in the same VDUL, the system would select the one where the DUL for the forward-most primary axle is lowest.

And in this case with the truck 10 overloaded in respect to the maximum gross vehicle weight allowed by the FBF, it is determined that the most suitable axle loading would be obtained by increasing the weight carried by the deployed pusher axle 30A from 4,230 pound to 6,870 pounds, maintaining the weight on the deployed pusher axles 30B and 30C at their maximum allowable load of 8,000 pounds and increasing the weight on the deployed trailing axle from 12,770 pounds to its maximum allowed carrying weight of 13,000 pounds. That would result in the front axle 22 then carrying 16,000 pounds and thus within this axle's optimum weight-carrying range and the tandem axles 26A and 26B carrying 33,130 pounds that is thus less than their maximum allowable weight of 34,000 pounds imposed by the FBF but greater than their maximum optimum carrying weight. And the Computer 102 provides this determination of the most suitable auxiliary axle usage to the vehicle operator via the Information Module (IM) 108 who can then carry out such as shown in FIG. 15 via the Central Command Module (CCM) 98 and Master Control Valve Center (MCVC) 96 with the axle loadings set as described above. And with the Computer 102 also informing the vehicle operator via the Informational Module (IM) 108 that the only noncompliance is that the maximum allowable gross vehicle weight of 80,000 pounds set by the FBF has been exceeded.

Figure 16:
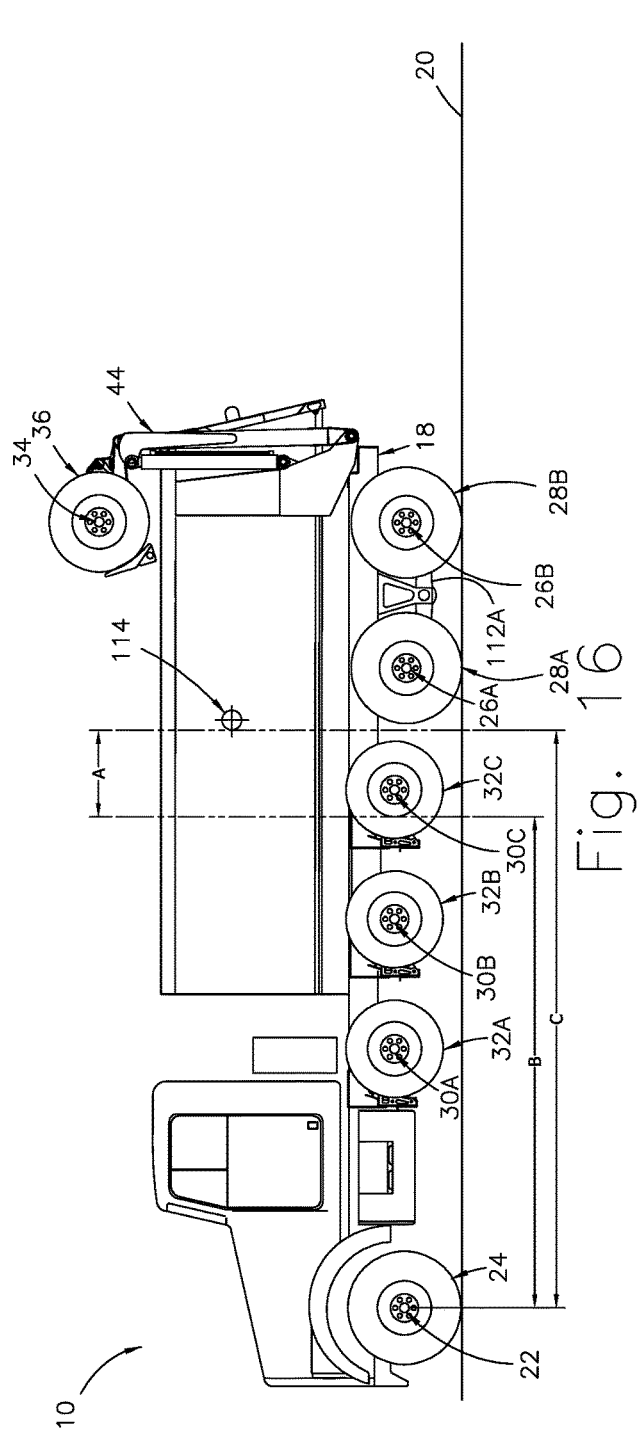

Turning now to FIG. 16, the dump truck 10 is shown with all auxiliary axles stowed and a load of 52,000 pounds has been added resulting in the gross vehicle weight being 80,000 pounds that is the maximum allowed by the FBF with all the available auxiliary axles supporting the vehicle. But in this case the existing center of gravity 114 is located outside and rearward of the compliance-manageable range A with the weight sensors (WS) informing the Computer 102 that the weight on the front axle 22 is 13,940 pounds and that on the tandem axles 26A and 26B is 66,060 pounds. And with Computer 102 programmed as set forth in detecting this condition then determines that the most suitable auxiliary axle use is established with deployment of all the auxiliary axles. Wherein the pusher axle 30A carries its minimum allowable weight of 1,500, the pusher axle 30B carries 6,500 pounds that is within its allowable weight-carrying range, the pusher axle 30C carries its maximum allowable carrying weight of 8,000, and the trailing axle 34 carries its maximum allowable carrying weight of 13,000 pounds.

Figure 17:
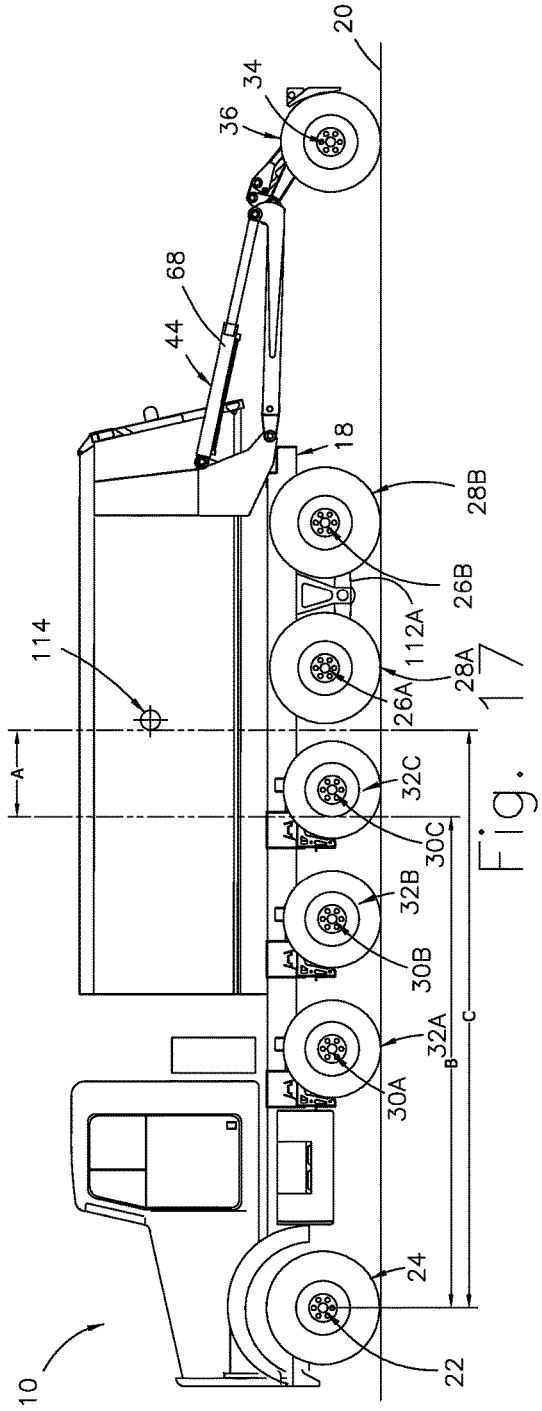

The Computer 102 provides this determination of the most suitable auxiliary axle usage to the vehicle operator via the Information Module (IM) 108 who can then carry out such via the Central Command Module (CCM) 98 and Master Control Valve Center (MCVC) 96 as shown in FIG. 17. That results in the front axle 22 carrying its minimum allowable carrying weight of 14,000 pounds and the tandem axles 26A and 26B carrying 36,120 pounds that is greater than the 34,000 pounds allowed by the FBF. And the Computer 102 sends relevant information to the vehicle operator via the Informational Module (IM) 108 that indicates that the weight on the tandem axles 26A and 26B exceeds their maximum allowed carrying weight and that the vehicle's center of gravity 114 is located too far rearward and outside the compliance-manageable range A that would enable compliance with allowable axle loadings as well as with the maximum gross vehicle weight of 80,000 pounds imposed by the FBF.

Turning now to FIG. 18, the truck 10 is shown with all auxiliary axles stowed and a load of 52,000 pounds has been added resulting in the gross vehicle weight being 80,000 pounds that is the maximum allowed by the FBF with all the available auxiliary axles supporting the vehicle. But in this case the existing center of gravity 114 is located outside and forward of the compliance-manageable range A with the weight sensors (WS) informing the Computer 102 that the weight on the front axle 22 is 25,760 pounds and that on the tandem axles 26A and 26B is 54,240 pounds. And with the Computer 102 programmed as set forth in detecting this condition then determines that the most suitable auxiliary axle usage is established with deployment of all the auxiliary axles. Wherein the pusher axle 30A carries its maximum allowable weight of 8,000 pounds, the pusher axle 30B carries its maximum allowable weight of 8,000 pounds, the pusher axle 30C carries 7,840 and thus close to its maximum allowable weight of 8,000, and the trailing axle 34 carries 10,160 pounds that is within its allowable weight-carrying range.

The Computer 102 provides this determination of the most suitable auxiliary axle usage to the vehicle operator via the Information Module (IM) 108 who can then carry out such via Central Command Module (CCM) 98 and the Master Control Valve Center (MCVC) 96 as shown in FIG. 19 with the auxiliary axles loadings set as indicated above. That results in the front axle 22 carrying its maximum allowable weight of 20,000 pounds and the tandem axles 26A and 26B carrying their minimum allowable weight of 26,000 pounds. And the Computer 102 also sends relevant information to the vehicle operator via the Informational Module 108 that indicates that the truck is loaded too far forward and that the only noncompliance with weight limitations results from the group of axles consisting of all axles except the trailing axle now carrying 69,840 pounds that exceeds the FBF limit of 68,000 pounds.

Moreover, it will also be observed that the Axle Load Monitoring System (ALMS) 100 is adapted as set forth to provide the vehicle operator via the Informational Module (IM) 108 with all the then relevant information pertaining to each of the above situations starting with the addition of a load to the dump truck 10. And to further aid in understanding the versatility of the Axle Load Monitoring System, the application thereof to other auxiliary axle arrangements is shown in FIGS. 20-32. Wherein it will be understood that each auxiliary axle has a control circuit comparable to those described above and that a tag axle has a suspension system and control circuit like that of a pusher axle as described above. And in each case, only the near-side wheels appear and an auxiliary axle is shown in its stowed inactive condition with solid lines and is shown in its deployed active condition with phantom lines.

Referring now to FIG. 20, there is shown a dump truck 116 like that in U.S. Pat. No. 8,523,203 to which the Axle Load Monitoring System (ALMS) 100 has been applied. Wherein the primary axles comprise a front axle 118 with steerable wheels 120 and powered tandem axles 122A and 122B with dual wheels 124A and 124B respectively at their outboard ends. And the auxiliary axles comprise three pusher axles 126A, 126B and 126C with wheels 128A, 128B and 128C respectively, and a trailing axle 130 with wheels 132. And wherein that the hydraulic cylinders 134 in the trailing axle suspension system 136 are pivotally connected to the dump body 138 at a strategically high elevation to provide for enhanced roll stability of the truck derived from the trailing axle on deployment.

In applying the Axle Load Monitoring System (ALMS) 100 to the dump truck 116, the Computer 102 is provided with the relevant information indicated to the extent needed in enabling the ALMS to determine suitable usage of the pusher axles 126A, 126B and 126C and trailing axle 130 as load is added to the truck. With such auxiliary axle usage as determined recommended to the vehicle operator who can then apply such to the operation of the auxiliary axles employing the control there over that is available or can be added as needed.

And for example, such determination of auxiliary axle usage by the ALMS 100 as applied to the dump truck 116 would provide for establishing full compliance with the maximum allowable axle loadings provided with respect to the truck when the truck's center of gravity 140 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 140X and 140XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the dump truck 116 with other useful information gained from the axle load monitoring provided thereby.

Referring now to FIG. 21, there is shown a dump truck 142 like that in the previously-identified U.S. Pat. No. 9,738,338 entitled "DUAL TRAILING AXLE SUSPENSION SYSTEM" which is hereby incorporated by reference. With the primary axles comprising a front axle 146 with steerable wheels 148 and powered tandem axles 150A and 150B with dual wheels 152A and 152B respectively. And with the auxiliary axles comprising three pusher axles 154A, 154B and 154C with wheels 156A, 156B and 156C respectively and a pair of trailing axles 158A and 158B with wheels 160A and 160B respectively that are suspended from the dump body 164 of the truck by a dual trailing axle suspension system 166. Wherein the dual trailing axle suspension system 166 includes a pair of laterally-spaced hydraulically-operated actuators 168 (only the nearside one being shown) that are operable to stow the trailing axles 158A and 158B on the truck as shown in solid lines and deploy the trailing axles as shown in phantom lines and while deployed establish a resisting force that enables air springs (not shown) in forcing the trailing axles to help support the dump truck 142 in a controllable manner.

In applying the ALMS 100 to the dump truck 142, the Computer 102 is provided with the relevant information indicated to the extent needed in enabling the ALMS to determine suitable usage of the pusher axles 154A, 154B and 154C and the trailing axles 158A and 158B as load is added to the truck. With such auxiliary axle usage as determined made available to the vehicle operator who can then apply such to the operation of these auxiliary axles employing the control there over that is available or can be added as needed.

And for example, such determination of auxiliary axle usage by the ALMS 100 as applied to the dump truck 142 will provide for establishing full compliance with the prescribed maximum allowable axle loadings provided the vehicle's center of gravity 170 that exists at or below the maximum allowable gross vehicle weight for the truck is located as shown in the applicable compliance-manageable range A that is based on the truck being loaded to its maximum allowable weight and also to the extent possible in minimizing noncompliance with the allowable individual axle and axle group loadings when the center of gravity that exists with the maximum allowable gross vehicle weight for the truck is in either of the locations 170X and 170XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the dump truck 142 with other useful information gained from the axle load monitoring provided thereby.

Furthermore, in the previously-identified U.S. Pat. No. 9,731,780 entitled "TRAILER HITCH" which is hereby incorporated by reference, there is disclosed trailer axles that also serve as trailing axles. And in applying the ALMS 100 thereto, results like that described above with respect to the trailing axles in FIG. 21 are similarly obtained with the trailer axles serving as trailing axles.

Referring now to FIG. 22, there is shown another dump truck 172. Wherein the primary axles comprise a front axle 174 with steerable wheels 176 and powered tandem axles 178A and 178B with dual wheels 180A and 180B respectively at their outboard ends. And only a singular auxiliary axle is provided by a pusher axle 182 with wheels 184.

In applying the Axle Load Monitoring System (ALMS) 100 to the dump truck 172, the Computer 102 is provided with the relevant information indicated to the extent needed in enabling the ALMS to determine suitable usage of the pusher axle 182 as load is added to the truck. With such auxiliary axle usage as determined made available to the vehicle operator who can then apply such to the operation of this auxiliary axle employing the control there over that is available or can be added as needed.

And for example, such determination of auxiliary axle usage by the ALMS 100 as applied to the dump truck 172 will provide for establishing full compliance with the maximum allowable axle loadings provided with respect to the truck when the truck's center of gravity 186 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 186X and 186XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the dump truck 172 with other useful information gained from the axle load monitoring provided thereby.

Referring now to FIG. 23, there is shown a refuse truck 188. Wherein the primary axles comprise a front axle 190 with steerable wheels 192 and powered tandem axles 194A and 194B with dual wheels 196A and 196B respectively at their outboard ends. And the auxiliary axles comprise a pusher axle 198 with wheels 200 and a tag axle 202 with wheels 204.

In applying the Axle Load Monitoring System (ALMS) 100 to the refuse truck 188, the Computer 102 is provided is provided with the relevant information indicated to the extent needed in enabling the ALMS to determine suitable usage of the pusher axle 198 and tag axle 202 as load is added to the truck. With such auxiliary axle usage as determined made available to the vehicle operator who can then apply such to the operation of these auxiliary axles employing the control there over that is available or can be added as needed.

And for example, such determination of auxiliary axle usage by the ALMS 100 as applied to the refuse truck 188 will provide for establishing full compliance with the maximum allowable axle loadings provided with respect to the truck when the truck's center of gravity 206 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 206X and 206XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the refuse truck 188 with other useful information gained from the axle load monitoring provided thereby.

Referring now to FIG. 24, there is shown another refuse truck 208. Wherein the refuse truck is like that in U.S. Pat. No. 8,523,202 and has primary axles consisting of a front axle 210 with steerable wheels 212, powered tandem axles 214A and 214B with dual wheels 216 and 216B respectively at their outboard ends, and auxiliary axles consisting of a pusher axle 218 with wheels 220 and a trailing axle 222 with wheels 224.

In applying the Axle Load Monitoring System (ALMS) 100 to the refuse truck 208, the Computer 102 is provided with the relevant information indicated to the extent needed in enabling the ALMS to determine suitable usage of the pusher axle 218 and trailing axle 222 as load is added to the truck. With such auxiliary axle usage as determined made available to the vehicle operator who can then apply such to the operation of these auxiliary axles employing the control there over that is available or can be added as needed.

And for example, such determination of auxiliary axle usage by the ALMS 100 as applied to the refuse truck 208 will provide for establishing full compliance with the maximum allowable axle loadings provided with respect to the truck when the truck's center of gravity 226 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 226X and 226XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the operator of the refuse truck 208 with other useful information gained from the axle load monitoring provided thereby.

Referring now to FIG. 25, there is shown another refuse truck 228. Wherein the refuse truck has primary axles consisting of forwardly-located axles 230A and 230B with interlinked steerable wheels 232A and 232B respectively and rearwardly-located powered tandem axles 234A and 234B with dual wheels 236A and 236B respectively at their outboard ends. And for auxiliary axle support, the truck has a trailing axle 238 with wheels 240 wherein the trailing axle suspension system is like that in U.S. Pat. No. 8,523,202.

In applying the Axle Load Monitoring System (ALMS) 100 to the refuse truck 228, the Computer 102 is provided with the relevant information indicated to the extent needed in enabling the ALMS to determine suitable usage of the trailing axle 238 as load is added to the truck. With such auxiliary axle usage as determined made available to the vehicle operator who can then apply such to the operation of these auxiliary axles employing the control there over that is available or can be added as needed.

And for example, such determination of auxiliary axle usage by the ALMS 100 as applied to the refuse truck 228 will provide for establishing full compliance with the maximum allowable axle loadings provided with respect to the truck when the truck's center of gravity 244 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 244X and 244XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the refuse truck 228 with other useful information gained from the axle load monitoring provided thereby.

Referring now to FIG. 26, there is shown a transit mixer truck 248. Wherein the truck has primary axles consisting of a front axle 250 with steerable wheels 252 and powered tandem axles 254A and 254B with dual wheels 256A and 256B respectively at their outboard ends, and auxiliary axles consisting of a pusher axle 258 with wheels 260 and a trailing axle 262 with wheels 264.

In applying the Axle Load Monitoring System (ALMS) 100 to the transit mixer truck 248, the Computer 102 is provided with the relevant information indicated to the extent needed in enabling the ALMS to determine suitable usage of the pusher axle 258 and trailing axle 262 as load is added to the truck. With such auxiliary axle usage as determined made available to the vehicle operator who can then apply such to the operation of these auxiliary axles employing the control there over that is available or can be added as needed.

And for example, such determination of auxiliary axle usage by the ALMS 100 as applied to the transit mixer truck 248 will provide for establishing full compliance with the maximum allowable axle loadings provided with respect to the truck when the truck's center of gravity 266 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 266X and 266XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the transit mixer truck 248 with other useful information gained from the axle load monitoring provided thereby.

Referring now to FIG. 27, there is shown a military load-transporting truck 268. Wherein the primary axles comprise a front axle 270 with steerable wheels 272 and powered tandem axles 274A and 274B with dual wheels 276A, and 276B respectively at their outboard ends. And wherein the truck has a singular auxiliary axle in the form of a pusher axle 278 with wheels 280.

In applying the Axle Load Monitoring System (ALMS) 100 to the military load-transporting truck 268, the Computer 102 is provided with the relevant information indicated to the extent needed in enabling the ALMS to determine suitable usage of the pusher axle 278 as load is added to the truck. With such auxiliary axle usage as determined by the ALMS made available to the vehicle operator who can then apply such to the operation of this auxiliary axle by the employing the control there over that is available or can be added as needed.

And for example, such determination of auxiliary axle usage by the ALMS 100 as applied to the military load-transporting truck 268 will provide for establishing full compliance with the maximum allowable axle loadings provided with respect to the truck when the truck's center of gravity 282 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 282X and 282XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the military load-transporting truck 268 with other useful information gained from the axle load monitoring provided thereby.

Referring now to FIG. 28, there is shown another military load-transporting truck 284. Wherein the primary axles comprise a front axle 286 with steerable wheels 288 and powered tandem axles 290A and 290B with wheels 292A, and 292B respectively at their outboard ends. And wherein a singular auxiliary axle is provided by a tag axle 294 with wheels 296.

In applying the Axle Load Monitoring System (ALMS) 100 to the military load-transporting truck 284, the Computer 102 is provided with the relevant information indicated to the extent needed in enabling the ALMS to determine suitable usage of the tag axle 294 as load is added to the truck. With such auxiliary axle usage as determined by the ALMS made available to the vehicle operator who can then apply such to the operation of this auxiliary axle by the employing the control there over that is available or can be added as needed.

And for example, such determination of auxiliary axle usage by the ALMS 100 as applied to the military load-transporting truck 284 will provide for establishing full compliance with the maximum allowable axle loadings provided with respect to the truck when the truck's center of gravity 298 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 298X and 298XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the military load-transporting truck 284 with other useful information gained from the axle load monitoring provided thereby.

Referring now to FIG. 29, there is shown an open-bed truck 300. Wherein the primary axles comprise a front axle 302 with steerable wheels 304 and powered tandem axles 306A and 306B with dual wheels 308A, and 308B respectively at their outboard ends. And the auxiliary axles comprise a pusher axle 310 with wheels 312 and a tag axle 314 with wheels 316.

In applying the Axle Load Monitoring System (ALMS) 100 to the open-bed truck 300, the Computer 102 is provided with the relevant information indicated to the extent needed in enabling the ALMS to determine suitable usage of the pusher axle 310 and tag axle 314 as load is added to the truck. With such auxiliary axle usage as determined by the ALMS made available to the vehicle operator who can then apply such to the operation of these auxiliary axles by the employing the control there over that is available or can be added as needed.

And for example, such determination of auxiliary axle usage by the ALMS 100 as applied to the open-bed truck 300 will provide for establishing full compliance with the maximum allowable axle loadings provided with respect to the truck when the truck's center of gravity 318 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 318X and 318XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the vehicle operator of the open-bed 300 with other useful information gained from the axle load monitoring provided thereby.

Referring now to FIG. 30, there is shown an extended open-bed truck 320. Wherein the primary axles comprise a front axle 322 with steerable wheels 324 and powered tandem axles 326A and 326B with dual wheels 328A and 328B respectively at their outboard ends. And there are multiple auxiliary axles comprising pusher axles 330A, 330B and 330C and tag axles 334A and 334B with wheels 336A and 336B respectively.

In applying the Axle Load Monitoring System (ALMS) 100 to the open-bed truck 320, the Computer 102 is provided with at least the required information as set forth in relation to this truck in enabling the ALMS to determine suitable usage of the pusher axles 330A, 330B, and 330C and the tag axle 334A and 334B as load is added to the truck. With such auxiliary axle usage as determined by the ALMS made available to the vehicle operator who can then apply such to the operation of these auxiliary axles by employing the control there over that is available or can be added as needed.

And for example, such determination of auxiliary axle usage by the ALMS 100 as applied to the extended-body truck 320 will provide for establishing full compliance with the maximum allowable axle loadings provided with respect to the truck when the truck's center of gravity 338 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 338X and 338XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the operator of the open-bed truck 320 with other useful information gained from the axle load monitoring provided thereby.

Referring now to FIG. 31, there is shown a liquid-transporting truck 340. Wherein the primary axles comprise a front axle 342 with steerable wheels 344 and powered tandem axles 346A and 346B with dual wheels 348A, and 348B respectively at their outboard ends. And wherein there are multiple auxiliary axles consisting of a pusher axle 350 with wheels 352 and a tag axle 354 with wheels 356.

In applying the Axle Load Monitoring System (ALMS) 100 to the liquid-transporting truck 340, the Computer 102 is provided with the relevant information indicated to the extent needed in enabling the ALMS to determine suitable usage of the pusher axle 350 and tag axle 354 as load is added to the truck. With such auxiliary axle usage as determined by the ALMS made available to the vehicle operator who can then apply such to the operation of these auxiliary axles by employing the control there over that is available or can be added as needed.

And for example, such determination of auxiliary axle usage by the ALMS 100 as applied to the liquid-transporting truck 340 will provide for establishing full compliance with the maximum allowable axle loadings provided with respect to the truck when the truck's center of gravity 358 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 358X and 358XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the operator of the truck 340 with other useful information gained from the axle load monitoring provided thereby.

Figure 32:
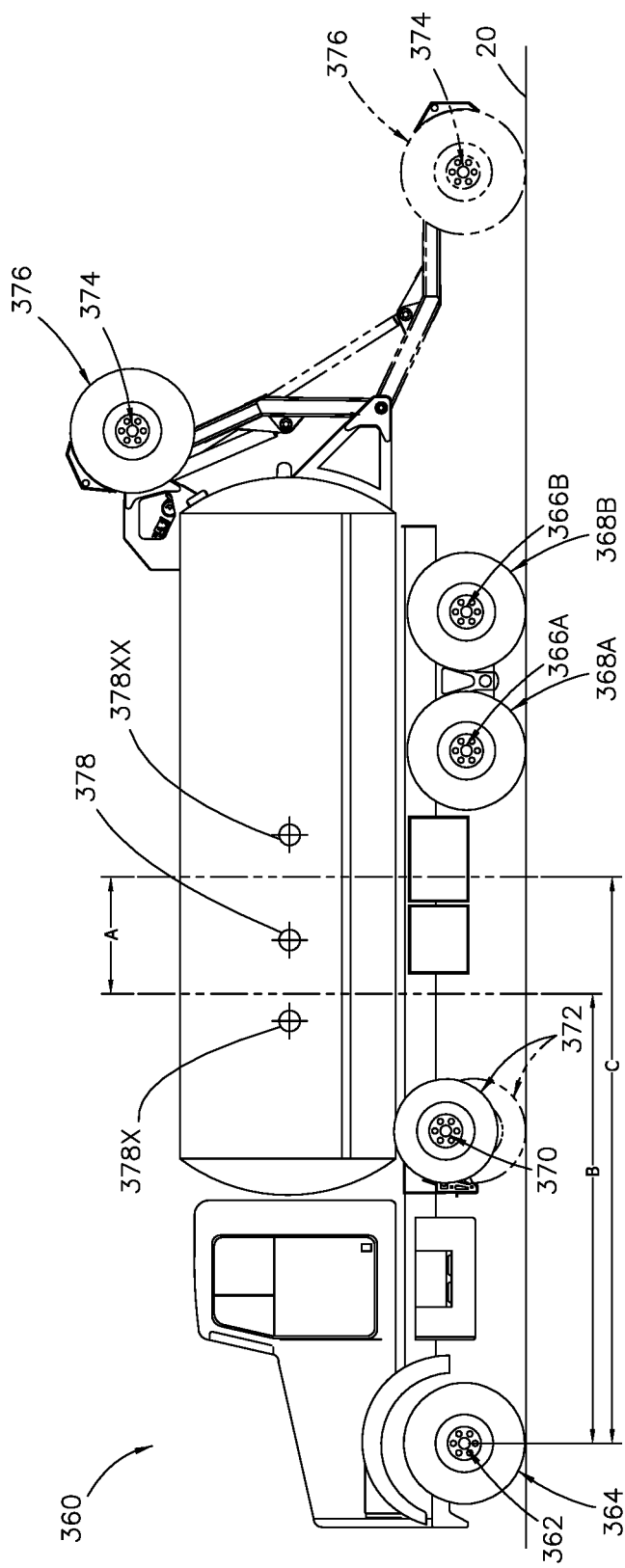
FIG. 32 is a side view of another liquid-transporting truck provided with the axle load monitoring system according to the present invention wherein the truck has a pusher axle and a trailing axle.

Referring now to FIG. 32, there is shown another liquid-transporting truck 360. Wherein the primary axles comprise a front axle 362 with steerable wheels 364 and powered tandem axles 366A and 366B with dual wheels 368A and 368B respectively at their outboard ends. And wherein there are multiple auxiliary axles consisting of a pusher axle 370 with wheels 372 and a trailing axle 374 with wheels 376.

In applying the Axle Load Monitoring System (ALMS) 100 to the liquid-transporting truck 360, the Computer 102 is provided with the relevant information indicated to the extent needed in enabling the ALMS to determine suitable usage of the pusher axle 370 and trailing axle 374 as load is added to the truck. With such auxiliary axle usage as determined by the ALMS made available to the vehicle operator who can then apply such to the operation of these auxiliary axles by employing the control there over that is available or can be added as needed.

And for example, such determination of auxiliary axle usage by the ALMS 100 as applied to the liquid-transporting truck 360 will provide for establishing full compliance with the maximum allowable axle loadings provided with respect to the truck when the truck's center of gravity 378 that exists with the maximum allowable gross vehicle weight for the truck is located as shown in the applicable compliance-manageable range A and also to the extent possible in minimizing noncompliance with the allowable axle loadings when the truck's center of gravity that exists with the maximum allowable gross vehicle weight is in either of the locations 378X and 378XX located outside this range. And with the auxiliary axle usage determined by the ALMS 100 when applied also minimizing any noncompliance with the allowable axle loadings to a prescribed degree when the truck's existing weight exceeds the maximum allowable gross vehicle weight with the existing center of gravity of the truck located within the compliance-manageable range that has narrowed as a result and also when the truck's existing weight is less than or more than the maximum allowable gross vehicle weight with the existing center of gravity of the truck located outside the then applicable compliance-manageable range. And with the ALMS 100 also providing the operator of the truck 360 with other useful information gained from the axle load monitoring provided thereby.

It will also be appreciated that having disclosed the Axle Load Monitoring System (ALMS) as applied to a wide variety of load-transporting vehicles, it will be appreciated that such can be applied to others employing other auxiliary axle usage involving a pusher axle, tag axle and/or trailing axle and in any suitable number regarding each. And it will also be appreciated that the vehicles may be with or without existing onboard means of detecting the weight carried by the axles and where they are without, such could be added or not and in the latter case such weight can be provided in an updating manner with the use of platform scales at a weighing station and portable scales placed under the wheels and transmitted by wire or by wireless transmission to the ALMS as earlier indicated. And regarding onboard weight detecting means and in lieu of weight sensors as demonstrated in the exemplary embodiments, suitable onboard weight sensors of various forms can be added in adapting the ALMS according to the present invention to a load-transporting motor vehicle.

It will also be appreciated that the primary and auxiliary axle suspension systems can also take other forms in utilizing the information provided by the ALMS in recommending deployment and the weight carried by one or more auxiliary axles and thereby the weight carried by the primary axles and thereby the weight carried by all the axles then supporting the vehicle. For example, the primary axle suspension systems can be of the air spring type or coil spring type to provide for cushioning. While the pusher axle and tag axle suspension systems can be of the hydraulically actuated type incorporating air springs or leaf or coil springs for cushioning and employing the hydraulic actuators for pusher axle and tag axle stowing and deployment and loading. And the trailing axle suspension system can be of the type wherein hydraulic actuators without gas spring action are utilized and cushioning is provided by leaf springs or coil springs or air springs that are separate from the actuators providing for trailing axle stowing and deployment and loading. And regarding air springs, they can also utilize a gas more suitable than air for the intended vehicle use.

And thus, the scope of the invention is intended to be limited only by the accompanying claims.

The invention claimed is:

1. An axle load monitoring system for a load-transporting motor vehicle wherein the vehicle has two or more primary axles and one or more auxiliary axles, the monitoring system comprises a computer located on the vehicle, weight-detecting means located on and/or off the vehicle adapted to detect the current weight carried by each axle, and communication means located on and/or off the vehicle, the computer is programmed to establish a compliance-manageable range specific to the vehicle with compliance-determining data provided via the communication means consisting of (1) a prescribed maximum allowable gross weight assigned to the vehicle determined by all the axles, (2) a prescribed maximum and minimum allowable carrying weight assigned to each axle and each designated axle group of consecutively arranged axles, and (3) the distance of each axle from a fixed datum point on the vehicle, the computer is adapted to receive via the communication means the current weight carried by the axles provided by the weight-detecting means and is programmed to utilize the compliance-determining data in detecting a noncompliant weight condition when (1) the current gross vehicle weight is more than the prescribed maximum allowable gross vehicle weight, and/or (2) the current carrying weight of any primary axle and any designated axle group is more than the prescribed maximum allowable carrying weight assigned thereto, and the computer on detecting the noncompliant weight condition is programmed to utilize the compliance-determining data in determining if the current gross vehicle weight is equal to or less than the prescribed maximum allowable gross vehicle weight and if the current center of gravity of the vehicle is in the compliance-manageable range and if so in both these regards recommend auxiliary axle usage covering stowing and deployment and loading via the communication means that would result in compliance with the prescribed maximum and minimum allowable carrying weight of each primary axle, designated axle group and utilized auxiliary axle.

2. An axle load monitoring system for a load-transporting motor vehicle as set forth in claim 1 wherein
the computer is provided via the communication means with the maximum allowable gross vehicle weight and the maximum allowable axle carrying weights and axle group carrying weights set by state and federal law and utilizes such when it is less than the prescribed maximum allowable carrying weight.

3. An axle load monitoring system for a load-transporting motor vehicle as set forth in claim 1 wherein
the computer is provided via the communication means with a prescribed operating pressure-force axle-loading relationship assigned to each available auxiliary axle and is programmed to utilize the prescribed pressure-force axle-loading relationship assigned thereto in recommending auxiliary axle usage.

4. An axle load monitoring system for a load-transporting motor vehicle as set forth in claim 1 wherein
the forward-most primary axle has a prescribed optimum weight-carrying range assigned thereto which is provided to the computer via the communication means, and
the monitoring system is programmed to utilize the prescribed optimum carrying weight range assigned to the forward-most primary axle in the recommending of auxiliary axle usage which would also result in the carrying weight on the forward-most primary axle being within its optimum weight-carrying range.

5. An axle load monitoring system for a load-transporting motor vehicle as set forth in claim 1 wherein
   each of the primary axles has a prescribed optimum weight-carrying range assigned thereto which is provided to the computer via the communication means, and
   the monitoring system is programmed to utilize the prescribed optimum weight-carrying ranges assigned to the primary axles in the recommending of auxiliary axle usage which would also result in the carrying weight on each primary axle being within its assigned optimum weight-carrying range.

6. An axle load monitoring system for a load-transporting motor vehicle as set forth in claim 1 wherein
   the computer is provided with a prescribed noncompliant weight-minimizing degree via the communication means, and
   the computer is programmed on finding that the current gross vehicle weight is located outside the compliance-manageable range to recommend auxiliary axle usage that would result in any noncompliant weight on the primary axles and any designated axle group being minimized to the prescribed noncompliant weight-minimizing degree.

7. An axle load monitoring system for a load-transporting motor vehicle as set forth in claim 1 wherein
   the computer is programmed to allow an operator of the motor vehicle to specify auxiliary axle usage via the communication means, and
   the computer is programmed to provide notification via the communication means when the operator-specified auxiliary axle usage would not result in obtaining compliance with the prescribed maximum and minimum allowable carrying weights assigned to the primary axles, any designated axle group and any utilized auxiliary axle.

8. An axle load monitoring system for a load-transporting motor vehicle as set forth in claim 1 wherein
   the computer is programmed to recommend via the communication means stowing an auxiliary axle when its usage is no longer needed.

9. An axle load monitoring system for a load-transporting motor vehicle as set forth in claim 1 wherein
   the computer is programmed to accept and utilize weight information provided by the weight-detecting means only when the motor vehicle is stationary and has remained so for a prescribed period of time.

10. An axle load monitoring system for a load-transporting motor vehicle as set forth in claim 1 wherein
    the computer is programmed to provide notification via the communication means when the maximum allowable gross vehicle weight has been exceeded.

11. An axle load monitoring system for a load-transporting motor vehicle as set forth in claim 1 wherein
    the computer is programmed to indicate via the communication means the current weight carried by each of the axles then supporting the motor vehicle.

12. An axle load monitoring system for a load-transporting motor vehicle as set forth in claim 1 wherein
    all the weight-detecting means are located on the motor vehicle.

13. An axle load monitoring system for a load-transporting motor vehicle as set forth in claim 1 wherein
    the computer is programmed to inform an operator of the motor vehicle via the communication means of the current location of the center of gravity of the motor vehicle relative to the compliance-manageable range when the current center of gravity of the motor vehicle is located outside thereof.

14. An axle load monitoring system for a load-transporting motor vehicle as set forth in claim 1 wherein
    the primary axles comprise an axle with steerable wheels and a powered axle.

15. An axle load monitoring system for a load-transporting motor vehicle as set forth in claim 1 wherein
    the primary axles comprise an axle with steerable wheels and powered tandem axles.

16. An axle load monitoring system for a load-transporting motor vehicle as set forth in claim 1 wherein
    the primary axles comprise tandem axles with steerable wheels.

17. An axle load monitoring system for a load-transporting motor vehicle as set forth in claim 1 wherein
    the auxiliary axles comprise one or more pusher axles.

18. An axle load monitoring system for a load-transporting motor vehicle as set forth in claim 1 wherein
    the auxiliary axles comprise one or more tag axles.

19. An axle load monitoring system for a load-transporting motor vehicle as set forth in claim 1 wherein
    the auxiliary axles comprise one or more trailing axles.

20. An axle load monitoring system for a load-transporting motor vehicle as set forth in claim 1 wherein
    a trailer hitched to the motor vehicle has one or more axles which also serve as an auxiliary axle in helping to support the motor vehicle.

* * * * *